US011947759B2

(12) United States Patent
Morikuni

(10) Patent No.: US 11,947,759 B2
(45) Date of Patent: Apr. 2, 2024

(54) PROJECTION SYSTEM SHARING IMAGE BETWEEN PROJECTION DEVICE AND DISPLAY DEVICE

(71) Applicant: SEIKO EPSON CORPORATION, Tokyo (JP)

(72) Inventor: Eiji Morikuni, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/085,532

(22) Filed: Dec. 20, 2022

(65) Prior Publication Data
US 2023/0195264 A1 Jun. 22, 2023

(30) Foreign Application Priority Data
Dec. 21, 2021 (JP) ................................. 2021-206794

(51) Int. Cl.
 *G06F 3/042* (2006.01)
 *H04N 9/31* (2006.01)

(52) U.S. Cl.
 CPC ......... *G06F 3/0425* (2013.01); *H04N 9/3176* (2013.01)

(58) Field of Classification Search
 CPC .................................................. G06F 3/0425
 See application file for complete search history.

(56) References Cited

U.S. PATENT DOCUMENTS

| 2012/0212415 | A1* | 8/2012 | Yokobayashi | G06F 3/0425 345/158 |
| 2015/0035995 | A1* | 2/2015 | Uchiyama | H04N 9/3191 348/189 |
| 2018/0220114 | A1* | 8/2018 | Ouchi | H04N 9/3185 |
| 2019/0235371 | A1* | 8/2019 | Imai | G06T 5/006 |

FOREIGN PATENT DOCUMENTS

| JP | 2005121747 | 5/2005 |
| JP | 2015161748 | 9/2015 |
| JP | 2018098598 | 6/2018 |

* cited by examiner

*Primary Examiner* — Chun-Nan Lin
(74) *Attorney, Agent, or Firm* — JCIPRNET

(57) ABSTRACT

With a projection device, a projection system including the projection device and a display device receives an image from the display device, projects the received image onto a projection target, captures a range including the projection target, and transmits the captured image to the display device. With the display device, the projection system receives the captured image from the projection device, displays the received captured image on the display, generates a drawing image based on a drawing operation, and transmits the generated drawing image to the projection device.

7 Claims, 17 Drawing Sheets

PROJECTION SYSTEM SHARING IMAGE BETWEEN PROJECTION DEVICE AND DISPLAY DEVICE

The present application is based on, and claims priority from JP Application Serial Number 2021-206794, filed Dec. 21, 2021, the disclosure of which is hereby incorporated by reference herein in its entirety.

BACKGROUND

1. Technical Field

The present disclosure relates to a projection system and a method of controlling the projection system.

2. Related Art

In the related art, a technique is known that draws, in a superimposed manner, letters and the like on an image projected or displayed by a projection device. For example, the device disclosed in JP-A-2015-161748 enables handwriting of letters in a superimposed manner on an image projected on a screen. This device can record data of handwriting letters in a recording medium in association with projected image data, and play the image data and the handwriting letters in a superimposed manner.

In the related art, a state where an image such as a projection image of a projector and handwriting letters and the like are superimposed cannot be shared between a plurality of devices.

SUMMARY

An aspect of the present disclosure is a projection system including a projection device and a display device, the projection device including a PJ communication unit, a projection unit configured to project an image onto a projection target, an image-capturing unit configured to capture a range including the projection target, and a PJ control unit configured to project an image received by the PJ communication unit with the projection unit, and transmit a captured image generated by the image-capturing unit with the PJ communication unit, the display device including a DP communication unit configured to communicate with the projection device, a display configured to display an image, an operation unit configured to accept a drawing operation, and a DP control unit configured to display, on the display, a captured image received by the DP communication unit, generate a drawing image based on the drawing operation accepted by the operation unit while the captured image is being displayed, and transmit, with the DP communication unit, the drawing image generated.

Another aspect of the present disclosure is projection system including a first projection device, a second projection device, and a display device, the first projection device including a first projection unit, a first image-capturing unit, a first PJ communication unit, and a first PJ control unit configured to project an image received by the first PJ communication unit with the first projection unit, generate a first captured image by capturing a range including a projection target of the first projection unit with the first image-capturing unit, and transmit the first captured image with the first PJ communication unit, the second projection device including a second projection unit, a second image-capturing unit, a second PJ communication unit, and a second PJ control unit configured to project an image received by the second PJ communication unit with the second projection unit, generate a second captured image by capturing a range including a projection target of the second projection unit with the second image-capturing unit, and transmit the second captured image with the second PJ communication unit, the display device including a display, an operation unit, a DP communication unit, and a DP control unit configured to communicate with the first projection device and the second projection device with the DP communication unit, display, in a first region of the display, the first captured image received from the first projection device, generate a first region drawing image based on a drawing operation corresponding to the first region accepted by the operation unit, transmit the first region drawing image to the first projection device, display, in a second region of the display, the second captured image received from the second projection device, generate a second region drawing image based on a drawing operation corresponding to the second region accepted by the operation unit, and transmit the second region drawing image to the second projection device.

Another aspect of the present disclosure is a projection system including a projection device, a first display device, and a second display device, the projection device including a PJ communication unit, a projection unit, an image-capturing unit, and a PJ control unit, the first display device including a first DP communication unit, a first display, a first operation unit, and a first DP control unit configured to display, on the first display, a captured image received by the first DP communication unit from the projection device, generate a first DP drawing image based on a drawing operation accepted by the first operation unit while the captured image is being displayed, and transmit, to the projection device, the first DP drawing image generated, with the first DP communication unit, the second display device including a second DP communication unit, a second display, a second operation unit, a second DP control unit configured to display, on the second display, a captured image received by the second DP communication unit from the projection device, generate a second DP drawing image based on a drawing operation accepted by the second operation unit while the captured image is being displayed, and transmit, to the projection device, the second DP drawing image generated, with the second DP communication unit. The PJ control unit communicates with the first display device and the second display device with the PJ communication unit, projects, with the projection unit, the first DP drawing image received from the first display device and the second DP drawing image received from the second display device, and transmits, to the first display device and the second display device, a captured image obtained with the image-capturing unit by capturing a range including a projection target on which the first DP drawing image and the second DP drawing image are projected.

Another aspect of the present disclosure is a controlling method for a projection system including a projection device and a display device. With the projection device, the method receives an image from the display device, projects the received image onto the projection target, captures a range including the projection target to generate a captured image, and transmits the captured image to the display device. With the display device, the method receives the captured image from the projection device, displays the received captured image on the display, generates the drawing image based on a drawing operation, and transmits the generated drawing image to the projection device.

Another aspect of the present disclosure is a controlling method for a projection system including a first projection device including a first projection unit, a first image-capturing unit, and a first PJ communication unit, a second projection device including a second projection unit, a second image-capturing unit, and a second PJ communication unit, and a display device including a display, an operation unit, and a DP communication unit. The first projection device is configured to receive an image from the display device, project the received image with the first projection unit, generate a first captured image by capturing a range including a projection target of the first projection unit with the first image-capturing unit, and transmit the first captured image with the first PJ communication unit. The second projection device is configured to receive an image with the second PJ communication unit, project the received image with the second projection unit, generate a second captured image by capturing a range including a projection target of the second projection unit with the second image-capturing unit, and transmit the second captured image with the second PJ communication unit. The display device is configured to communicate with the first projection device and the second projection device with the DP communication unit, display, in a first region of the display, the first captured image received from the first projection device, generate a first region drawing image based on a drawing operation corresponding to the first region accepted by the operation unit, transmit the first region drawing image to the first projection device, display, in a second region of the display, the second captured image received from the second projection device, generate a second region drawing image based on a drawing operation corresponding to the second region accepted by the operation unit, and transmit the second region drawing image to the second projection device.

Another aspect of the present disclosure is a controlling method for a projection system including a projection device including a PJ communication unit, a projection unit, and an image-capturing unit, a first display device including a first DP communication unit, a first display, and a first operation unit, and a second display device including a second DP communication unit, a second display, and a second operation unit. The first display device is configured to display, on the first display, a captured image received by the first DP communication unit from the projection device, generate a first DP drawing image based on a drawing operation accepted by the first operation unit while the captured image is being displayed, and transmit, to the projection device, the first DP drawing image generated, with the first DP communication unit. The second display device is configured to display, on the second display, a captured image received by the second DP communication unit from the projection device, generate a second DP drawing image based on a drawing operation accepted by the second operation unit while the captured image is being displayed, and transmit, to the projection device, the second DP drawing image generated, with the second DP communication unit. The projection device communicates with the first display device and the second display device with the PJ communication unit, projects, with the projection unit, the first DP drawing image received from the first display device and the second DP drawing image received from the second display device, and transmits, to the first display device and the second display device, a captured image obtained with the image-capturing unit by capturing a range including a projection target on which the first DP drawing image and the second DP drawing image are projected.

DESCRIPTION OF EXEMPLARY EMBODIMENTS

1. First Embodiment 1-1. Configuration of Projection System

Figure 1:
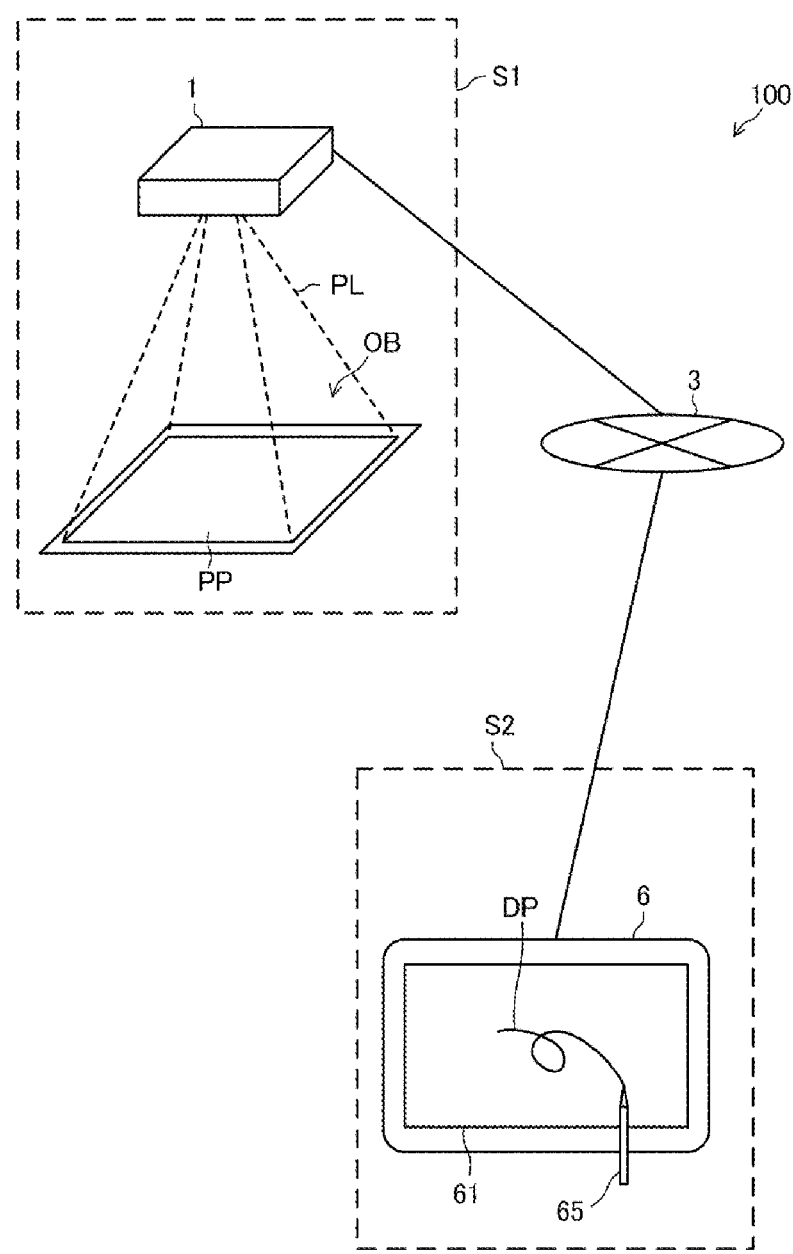
FIG. 1 is a diagram illustrating a schematic configuration of a projection system of a first embodiment.

FIG. 1 is a diagram illustrating a schematic configuration of a projection system 100 according to a first embodiment. The projection system 100 includes a projection device 1 and a display device 6. The projection device 1 and the display device 6 are connected with each other through a communication network 3 in such a manner as to enable mutual data communication.

Installation locations of the projection device 1 and the display device 6 are not limited, and a use location S1 of the projection device 1 and a use location S2 of the display device 6 may be separated from each other or adjacent to each other, for example.

The communication network 3 is a network that enables data communication between devices. The communication network 3 may be a local network such as a local area network (LAN) and a wide area network, for example. In addition, the communication network 3 may be an open network such as the Internet, for example. The communication network 3 may be configured to include communication lines such as a dedicated line, a public network, and a cellular communication line, and communication devices such as a router and a gateway device. The projection device 1 and the communication network 3 may be connected with each other in a wired manner through a communication cable or in a wireless manner through a radio communication channel. Likewise, the display device 6 and the communication network 3 may be connected with each other in a wired manner through a communication cable or in a wireless manner through a radio communication channel. The communication cable is a LAN cable or a USB cable compatible with universal serial bus (USB) communication standard, for example. The radio communication channel is configured of Wi-Fi, Bluetooth or the like, for example. Wi-Fi is a registered trademark. Bluetooth is a registered trademark.

The projection device 1 forms a projection image PP on a projection target OB by projecting image light PL toward the projection target OB. The projection of the image light PL at the projection device 1 corresponds to display of the projection image PP on the projection target OB. In the following description, an image includes a video and a still image.

FIG. 1 illustrates a configuration in which the projection device 1 is disposed above the projection target OB and the image light PL is projected downward from the projection device 1, but this an example. The projection target OB may be a flat surface, or a surface with curvature or irregularity. The position of the projection device 1 and the orientation of the projection device 1 are set on the basis of the positional relationship with the projection target OB. For example, the projection device 1 may be installed in an orientation for horizontally projecting the image light PL, or in an orientation for upwardly projecting the image light PL.

As described later, the projection device 1 has a function of capturing the projection target OB. The projection device 1 transmits a captured image obtained by capturing the projection target OB to the display device 6 through the communication network 3.

The display device 6 is a device including a display 61. It suffices that the display device 6 is a device having the display 61, an input function and a communication function. For example, the display device 6 is composed of a tablet computer, a laptop computer, or a smartphone. The display device 6 described in the present embodiment has a function of detecting an operation of an instructing member 65 on the display 61 and drawing a drawing image DP on the basis of the operation of the instructing member 65. The instructing member 65 is a pen-type device as illustrated in FIG. 1. The display device 6 may be configured to be able to use the user's fingers as the instructing member 65. Here, the drawing means a process of generating image data of the drawing image DP on the basis of an operation of instructing member 65 and temporarily storing the generated image data in a memory.

1-2. Configurations of Projection Device and Display Device

Figure 2:
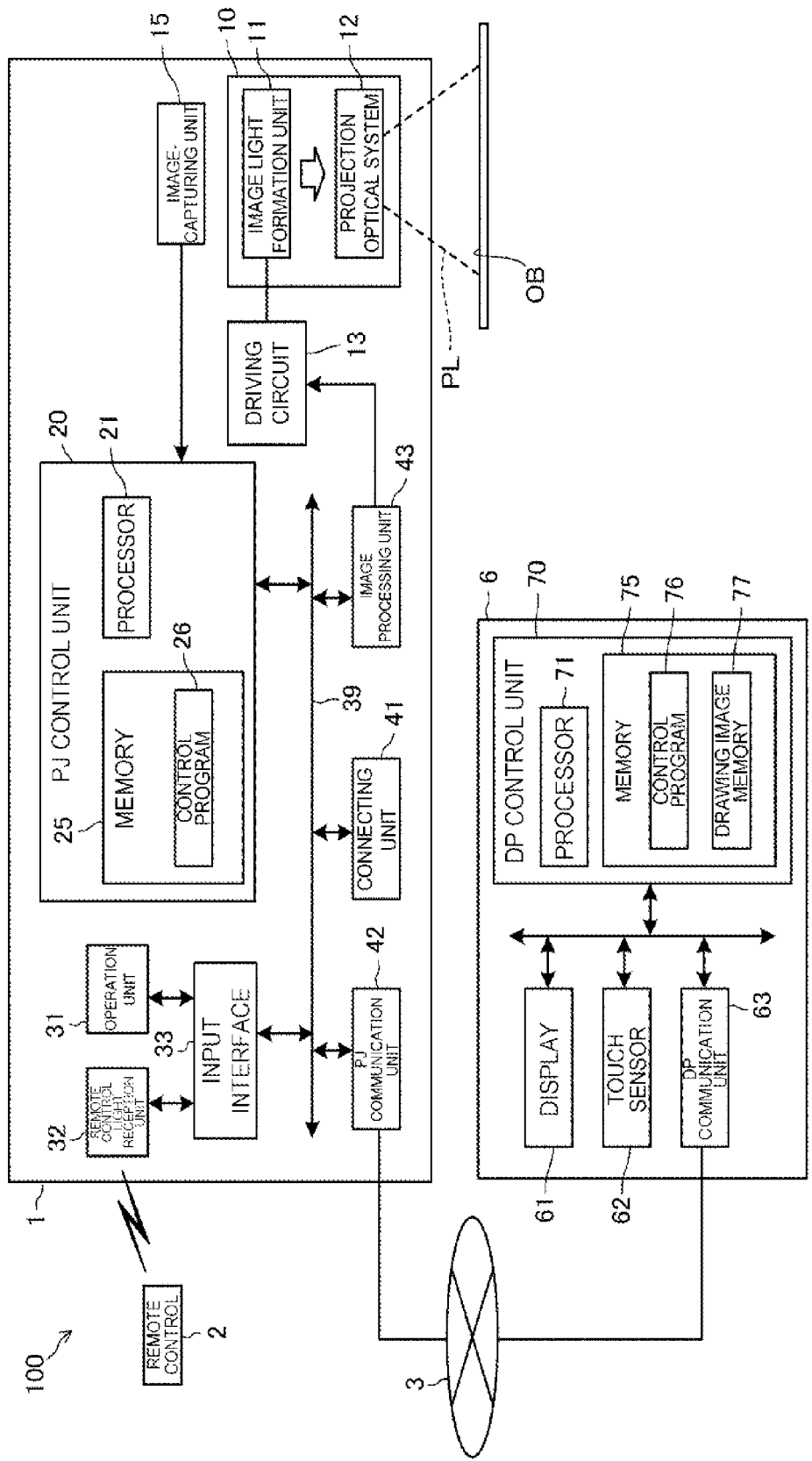
FIG. 2 is a block diagram illustrating each device of the projection system of the first embodiment.

FIG. 2 is a block diagram of each device of the projection system 100.

The projection device 1 includes a projection unit 10 that projects the image light PL and a driving circuit 13 that drives the projection unit 10. The projection unit 10 includes an image light formation unit 11 and a projection optical system 12.

The image light formation unit 11 generates the image light PL. The image light formation unit 11 includes a self-luminous element that emits light of predetermined colors. The light of predetermined colors is red light, blue light, and green light, for example. The self-luminous element may be a light emitting diode (LED) element, or an organic LED (OLED) element, for example. The configuration of the image light formation unit 11 is described later.

The image light formation unit 11 may include a light source including a lamp or a solid light source, and a light modulating device that modulates the light emitted by the light source, for example. Examples of the lamp include a halogen lamp, a xenon lamp, and a super-high-pressure mercury lamp. Examples of the solid light source include an LED and a laser light source. Examples of the light modulating device include a transmission type liquid crystal panel, a reflection type liquid crystal panel, and a digital micromirror device (DMD).

The projection optical system 12 includes an optical element that guides, toward the projection target OB, the image light PL emitted by the image light formation unit 11. The optical element includes a lens group including a plurality of lenses or one lens. The optical element may include a prism and a dichroic mirror.

The driving circuit 13 is connected to an image processing unit 43 described later. The driving circuit 13 forms the image light PL by driving the image light formation unit 11 on the basis of an image signal input from the image processing unit 43. For example, the driving circuit 13 forms images in a frame unit with the image light formation unit 11.

The projection device 1 includes an image-capturing unit 15. The image-capturing unit 15 is a digital camera including an imaging element. The image-capturing unit 15 performs image-capturing under the control of a PJ control unit 20 described later, and outputs the captured image to the PJ control unit 20. The image-capturing range of the image-capturing unit 15 includes the direction in which the projection unit 10 projects the image light PL. For example, the image-capturing range of the image-capturing unit 15 includes the projection target OB. The imaging element provided in the image-capturing unit 15 is, for example, a complementary metal oxide semiconductor (CMOS) image sensor or a charge coupled device (CCD) image sensor. The configuration of the image-capturing unit 15 will be described later together with the projection unit 10.

The projection device 1 includes a projection device control unit 20, an operation unit 31, a remote control light reception unit 32, an input interface 33, a connecting unit 41, a projection device communication unit 42, and the image processing unit 43. In the following description and figures, the projector may be abbreviated as PJ. For example, the projection device control unit 20 is referred to as PJ control unit 20, and the projection device communication unit 42 is referred to as PJ communication unit 42. The PJ control unit 20, the input interface 33, the connecting unit 41, the PJ communication unit 42, and the image processing unit 43 are connected to each other through a bus 39 in such a manner as to enable mutual data communication.

The operation unit 31 includes various buttons and switches provided at the housing surface of the projection device 1. The operation unit 31 generates an operation signal in accordance with the operation of buttons or switches, and outputs it to the input interface 33. The input interface 33 includes a circuit that outputs, to the PJ control unit 20, the operation signal input from the operation unit 31.

The remote control light reception unit 32 includes a light reception element that receives infrared light, and receives an infrared ray signal transmitted from a remote control 2. When a switch (not illustrated in the drawing) of the remote control 2 is operated, the remote control 2 transmits an infrared ray signal representing the operation. The remote control light reception unit 32 generates an operation signal by decoding the received infrared ray signal. The remote control light reception unit 32 outputs the generated operation signal to the input interface 33. The input interface 33 includes a circuit that outputs, to the PJ control unit 20, the operation signal input from the remote control light reception unit 32.

The specific configuration of transmitting and receiving the signal between the remote control 2 and the remote control light reception unit 32 is not limited. The configuration in which the remote control 2 transmits the infrared ray signal to the remote control light reception unit 32 is an example. For example, it is also possible to adopt a configuration in which a signal is transmitted and received between the remote control 2 and the remote control light reception unit 32 through a short-range wireless communication such as Bluetooth.

The connecting unit 41 is an interface device that receives image data from an external device. The connecting unit 41 is connected to players and personal computers that play optical disc-type storage media, for example.

The PJ communication unit 42 is connected to the communication network 3, and transmits and receives image data with the display device 6 through the communication network 3. The PJ communication unit 42 is a communication device including a connector that connects the communication cable and a communication circuit that inputs and outputs signals through the communication cable, for example. In addition, the PJ communication unit 42 may be a radio communication device. In this case, the PJ communication unit 42 includes an antenna, a radio frequency (RF) circuit, a baseband circuit and the like, for example.

The image processing unit 43 selects the image source under the control of the PJ control unit 20. The source that can be used by the projection device 1 is image data received at the connecting unit 41 and image data received at the PJ communication unit 42, for example.

The image processing unit 43 performs image processing on the image data of the selected source under the control of the PJ control unit 20. The image processing performed by the image processing unit 43 is resolution conversion processing, geometric correction processing, digital zoom processing, image correction processing for adjusting the image tint and luminance and the like, for example.

The image processing unit 43 generates an image signal on the basis of the image data after the image processing and outputs it to the driving circuit 13. A frame memory not illustrated in the drawing may be connected to the image processing unit 43. In this case, the image processing unit 43 loads the image data acquired from the source in the frame memory. The image processing unit 43 performs the image processing on the image data loaded in the frame memory.

The image processing unit 43 may be composed of an integrated circuit, for example. The integrated circuit is composed of a large scale integration (LSI), for example. To be more specific, the image processing unit 43 is composed of an application specific integrated circuit (ASIC), a programmable logic device (PLD) and the like. The PLD includes a field programmable gate array (FPGA), for example. In addition, a part of the configuration of the integrated circuit may include an analog circuit and may be a combination of a processor and an integrated circuit. The combination of a processor and an integrated circuit is called micro controller (MCU), system-on-a-chip (SoC), system LSI, chip set or the like.

The PJ control unit 20 includes a processor 21 and a memory 25. The memory 25 is storage device that stores, in a non-volatile manner, data and programs to be executed by the processor 21. The memory 25 is composed of a magnetic storage device, a semiconductor memory element such as a flash read only memory (ROM), or other nonvolatile storage devices. The memory 25 may include a random access memory (RAM) making up the work area of the processor 21. The memory 25 stores data to be processed by the processor 21 and a control program 26 to be executed by the processor 21.

The processor 21 is composed of a central processing unit (CPU), a micro-processing unit (MPU) or the like. The processor 21 may be composed of a single processor or may have a configuration in which a plurality of processors function as the processor 21. The processor 21 may be composed of an SoC integrated with a part or all of the memory 25 and/or another circuit. In addition, as described above, the processor 21 may be composed of a combination of a CPU that executes programs, and a digital signal processor (DSP) that executes a predetermined arithmetic processing. All functions of the processor 21 may be installed in the hardware or may be configured using a programmable device. In addition, the processor 21 may also serve the function of the image processing unit 43. That is, the function of the image processing unit 43 may be executed by the processor 21.

The processor 21 controls each unit of the projection device 1 by executing the control program 26 stored in the memory 25.

The processor 21 causes the image processing unit 43 to select the source and causes the image processing unit 43 to acquire the image data of the selected source. The processor 21 controls the driving circuit 13 to cause the projection unit 10 to project the image light PL and display the image on the basis of the image signal output by the image processing unit 43. In the operation of the projection device 1 described below, the processor 21 causes the projection unit 10 to project the image received from the display device 6 with the PJ communication unit 42.

The processor 21 controls the image-capturing unit 15 so as to capture the range including the projection target OB. With the PJ communication unit 42, the processor 21 transmits the captured image of the image-capturing unit 15 to the display device 6.

The display device 6 includes the display 61, a touch sensor 62, a display communication unit 63 and a display control unit 70. In the following description and drawings, the display may be abbreviated as DP. For example, the display communication unit 63 is referred to as DP communication unit 63, and the display control unit 70 is referred to as DP control unit 70.

The display 61 displays images under the control of the DP control unit 70. The display 61 includes a liquid crystal display panel, an organic EL display panel, or other display panels, for example.

The touch sensor 62 detects an operation on the display panel of the display 61. The touch sensor 62 detects a contact operation or a press operation on the display 61 and outputs a signal representing the operation position to the DP control unit 70. The touch sensor 62 is composed of a pressure-sensitive sensor, a resistance film sensor, or a capacitive sensor, for example. In addition, the touch sensor 62 may be configured to detect the operation by performing radio communication with the instructing member 65. The touch sensor 62 may be configured to detect the operation at one position on the display panel of the display 61 or configured to be able to simultaneously detect the operations at a plurality of positions on the display panel. The touch sensor 62 is an example of the operation unit.

The DP communication unit 63 is connected to the communication network 3, and transmits and receives data to and from the projection device 1 through the communication network 3. The DP communication unit 63 is a communication device including a connector that connects the communication cable and a communication circuit that inputs and outputs signals through the communication cable. In addition, the DP communication unit 63 may be a radio communication device. In this case, the DP communication unit 63 includes an antenna, an RF circuit, a baseband circuit and the like, for example.

The DP control unit 70 includes a processor 71 and a memory 75. The memory 75 is a storage device that stores, in a non-volatile manner, data and programs to be executed by the processor 71. The memory 75 is composed of a magnetic storage device, a semiconductor memory element such as a flash ROM, or other nonvolatile storage devices. The memory 75 may include a RAM making up the work area of the processor 71. The memory 75 stores data to be processed by the processor 71 and a control program 76 to be executed by the processor 71.

The processor 71 is composed of a CPU, an MPU or the like. The processor 71 may be composed of a single processor or may have a configuration in which a plurality of processors function as the processor 71. The processor 71 may be composed of an SoC integrated with a part or all of the memory 75 and/or another circuit. In addition, as described above, the processor 71 may be composed of a combination of a CPU that executes programs and a DSP that executes a predetermined arithmetic processing. All functions of the processor 71 may be installed in the hardware, or configured using a programmable device.

The processor 71 controls each unit of the display device 6 by executing the control program 76 stored in the memory 75.

The processor 71 causes the DP communication unit 63 to receive capturing image data transmitted by the projection device 1. The processor 71 displays the capturing image data received by the DP communication unit 63 on the display 61.

The processor 71 accepts an operation detected by the touch sensor 62. The processor 71 generates a drawing image on the basis of the accepted operation. The processor 71 stores the generated drawing image in a drawing image memory 77. The drawing image memory 77 is a logical or virtual storage region using a part of the storage region of the memory 75. The processor 71 generates a transmission image including the drawing image stored in the drawing image memory 77, and transmits the transmission image to the projection device 1 with the DP communication unit 63.

1-3. Configurations of Projection Unit and Image-Capturing Unit

Figure 3:
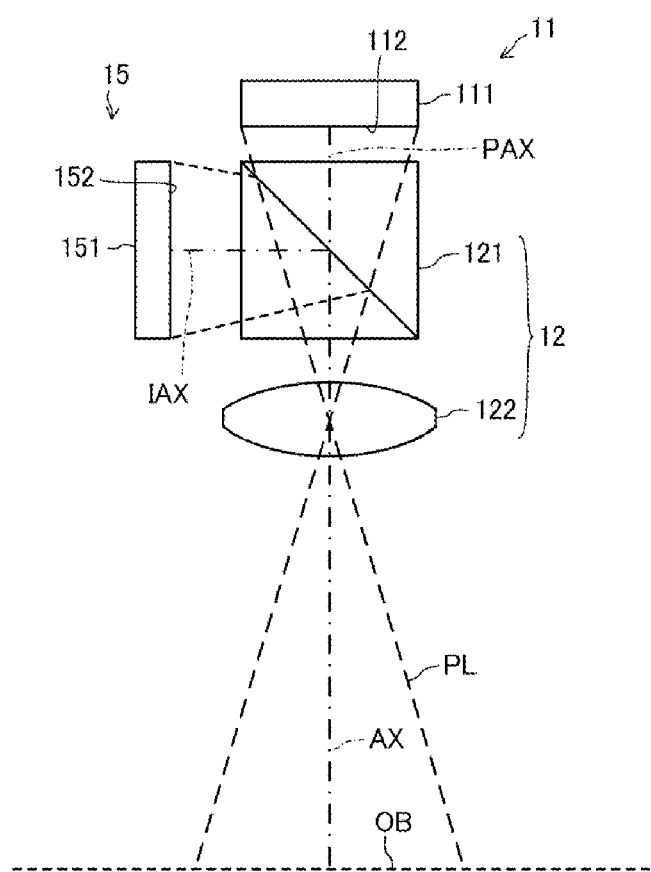
FIG. 3 is a schematic view illustrating exemplary configurations of a projection unit and an image-capturing unit.

FIG. 3 is a schematic view illustrating an exemplary configuration of the projection unit 10 and the image-capturing unit 15.

The projection optical system 12 includes a separation optical element 121 and a projection lens 122. The optical axis of the image light PL projected by the projection lens 122 toward the projection target OB is denoted with the reference numeral AX. The optical axis AX is the center axis of the image light PL emitted to the projection target OB from the projection lens 122, and is a virtual axis passing through the optical center of the projection lens 122 and extending along the direction in which the image light PL is emitted from the projection lens 122.

The image light formation unit 11 includes a light-emitting device 111. In the light-emitting device 111, light-emitting elements are disposed side by side at a light-emitting surface 112. The light-emitting elements disposed at the light-emitting surface 112 includes a light-emitting element that emits red light, a light-emitting element that emits blue light, and a light-emitting element that emits green light. These light-emitting elements are disposed in a matrix, and thus the light-emitting device 111 emits the image light PL forming images from the light-emitting surface 112.

The light-emitting surface 112 faces the separation optical element 121. The image light PL emitted by the light-emitting surface 112 travels along the optical axis AX, enters the separation optical element 121, passes through the separation optical element 121, and impinges on the projection lens 122. The projection lens 122 irradiates the projection target OB with the image light PL transmitted through the separation optical element 121. The optical axis of the image light PL emitted by the light-emitting surface 112 is referred to as projection optical axis PAX. The projection optical axis PAX is the center axis of the image light PL emitted by the light-emitting device 111, and is a virtual axis extending perpendicular to the light-emitting surface 112 and passing through the center of the region where the light-emitting element is disposed at the light-emitting surface 112. In the configuration illustrated in FIG. 3, the projection optical axis PAX coincides with the optical axis AX. In other words, the light-emitting device 111 is disposed on the optical axis AX of the projection optical system 12.

The image-capturing unit 15 includes an imaging device 151. The imaging device 151 is disposed to face the separation optical element 121. In the imaging device 151, imaging elements are disposed side by side at an imaging surface 152 facing the separation optical element 121. With each imaging element disposed at the imaging surface 152 and receiving light entering from the separation optical element 121, the image-capturing unit 15 performs image-capturing. The imaging device 151 faces a surface different from that of the light-emitting device 111 in the separation optical element 121. Specifically, the light-emitting device 111 is disposed next to the separation optical element 121 in the direction along the optical axis AX. On the other hand, the imaging device 151 faces the separation optical element 121 at 90 degrees with respect to the optical axis AX.

The separation optical element 121 allows the light emitted by the light-emitting device 111 to pass through it and impinge on the projection lens 122, whereas the separation optical element 121 reflects, toward the imaging device 151, the light entered the separation optical element 121 from the projection lens 122. A polarization separation element may be used as the separation optical element 121, for example. The separation optical element 121 may be composed of a dichroic mirror or a dichroic prism.

The optical axis of the light reflected by the separation optical element 121 toward the imaging device 151 is denoted with the reference numeral IAX. An image-capturing optical axis IAX is the center axis of the light travelling from the separation optical element 121 toward the imaging device 151, and is the axis of the light that is received by the imaging device 151 at the imaging surface 152. The image-capturing optical axis IAX is a virtual axis perpendicular to the imaging surface 152. In other words, the imaging device 151 is disposed such that the center of the imaging surface 152 coincides with the image-capturing optical axis IAX.

The image-capturing optical axis IAX coincides with the optical axis AX until the reflection inside the separation optical element 121.

That is, in the region closer to the projection target OB than the projection optical system 12, the projection optical axis PAX of the image light PL emitted by the image light formation unit 11 and the image-capturing optical axis IAX of the light received by the image-capturing unit 15 coincide with each other. In this manner, the projection unit 10 and the image-capturing unit 15 are optically coaxial. That is, the projection unit 10 and the image-capturing unit 15 coaxially performs projection and image-capturing of the image light PL.

FIG. 3 is a schematic view, and the projection unit 10, the projection optical system 12 and the image-capturing unit 15 may include members not illustrated in FIG. 3. For example, the projection optical system 12 may include optical elements different from the separation optical element 121 and the projection lens 122. For example, the projection optical system 12 may include a light guiding element between the separation optical element 121 and the projection lens 122. It is possible to provide a polarization separation element and a polarization conversion element between the light-emitting device 111 and the separation optical element 121 so as to adjust the polarization of the image light PL incident on the separation optical element 121.

Figure 4:
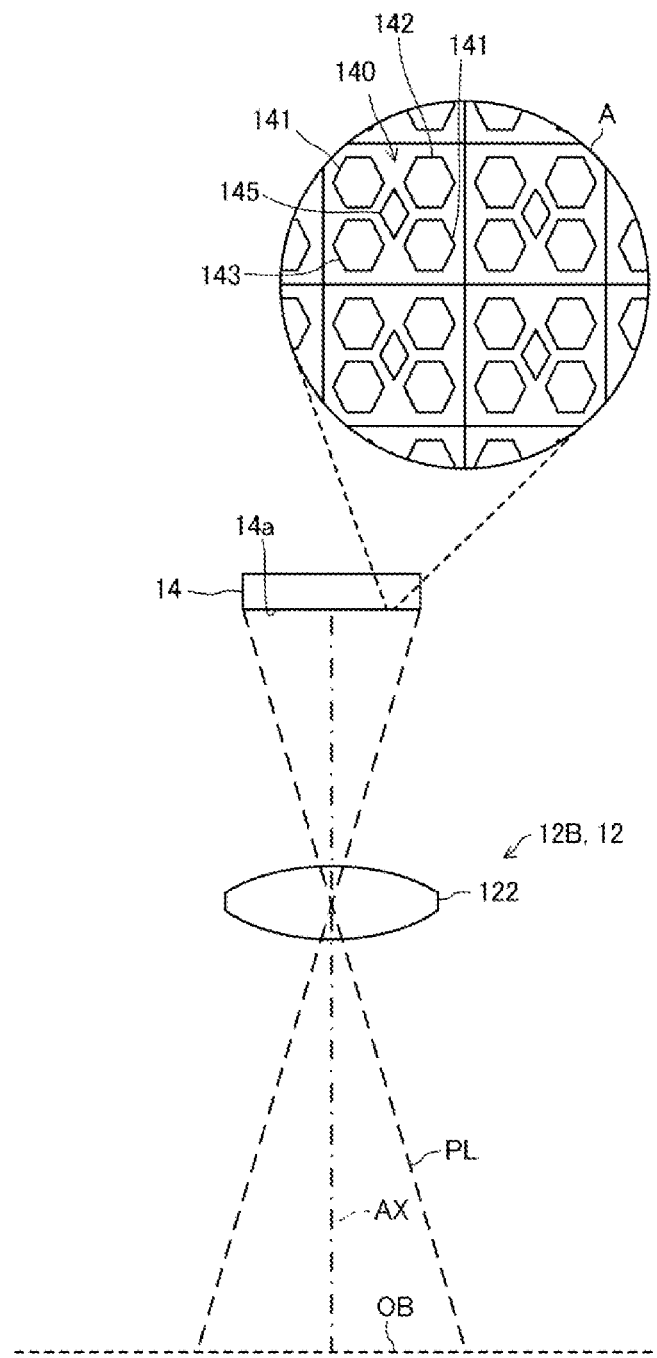
FIG. 4 is a schematic view illustrating other exemplary configurations of the projection unit and the image-capturing unit.

FIG. 4 is a schematic view illustrating another exemplary configuration of the projection unit 10 and the image-capturing unit 15.

This exemplary configuration uses a light receiving/emitting device 14 with the projection unit 10 and the image-capturing unit 15 integrated with each other. In the example of FIG. 4, the projection optical system 12 does not include the separation optical element 121. The projection lens 122 of FIG. 4 may be identical to the projection lens 122 exemplified in FIG. 3, or may have a different configuration.

The light receiving/emitting device 14 is disposed on the optical axis AX of the projection lens 122. The light receiving/emitting device 14 includes a light-emitting element and a light reception element at a light receiving/emitting surface 14a facing the projection lens 122. Specifically, as illustrated in an enlarged manner in a circle A in FIG. 4, a blue emission element 141, a red emission element 142, a green light-emitting element 143, and an imaging element 145 are disposed at the light receiving/emitting surface 14a.

The blue emission element 141, the red emission element 142, and the green light-emitting element 143 are composed of LEDs or OLEDs, for example. The blue emission element 141 is an element that emits light of the blue wavelength range, the red emission element 142 is an element that emits light of the red wavelength range, and the green light-emitting element 143 is an element that emits light of the green wavelength range. In the example illustrated in FIG. 4, two blue emission elements 141, one red emission element 142, one green light-emitting element 143, and one pixel region 140 are formed. The pixel region 140 is a region that forms one pixel included in the image formed by the light receiving/emitting device 14. The pixel region 140 forms the color of one pixel with two blue emission elements 141, one red emission element 142 and one green light-emitting element 143.

In the light receiving/emitting surface 14a, one the imaging element 145 is included in one pixel region 140. The imaging element 145 is an element composed of CMOS or CCD, and receives light incident on the light receiving/emitting surface 14a. The image-capturing unit 15 performs image-capturing through light reception at the imaging element 145.

In this manner, the light receiving/emitting device 14 functions as the image light formation unit 11 for forming the image light PL and the image-capturing unit 15 for performing image-capturing. The optical axis of the image light PL emitted by the light receiving/emitting device 14 is the optical axis AX, and the image-capturing unit 15 performs image-capturing with light that is incident along the optical axis AX. In the configuration illustrated in FIG. 4, as with the configuration illustrated in FIG. 3, the projection unit 10 and the image-capturing unit 15 are optically coaxial, and the projection unit 10 and the image-capturing unit 15 perform projection and image-capturing on the same axis.

1-4. Operation of Projection System

Figure 5:
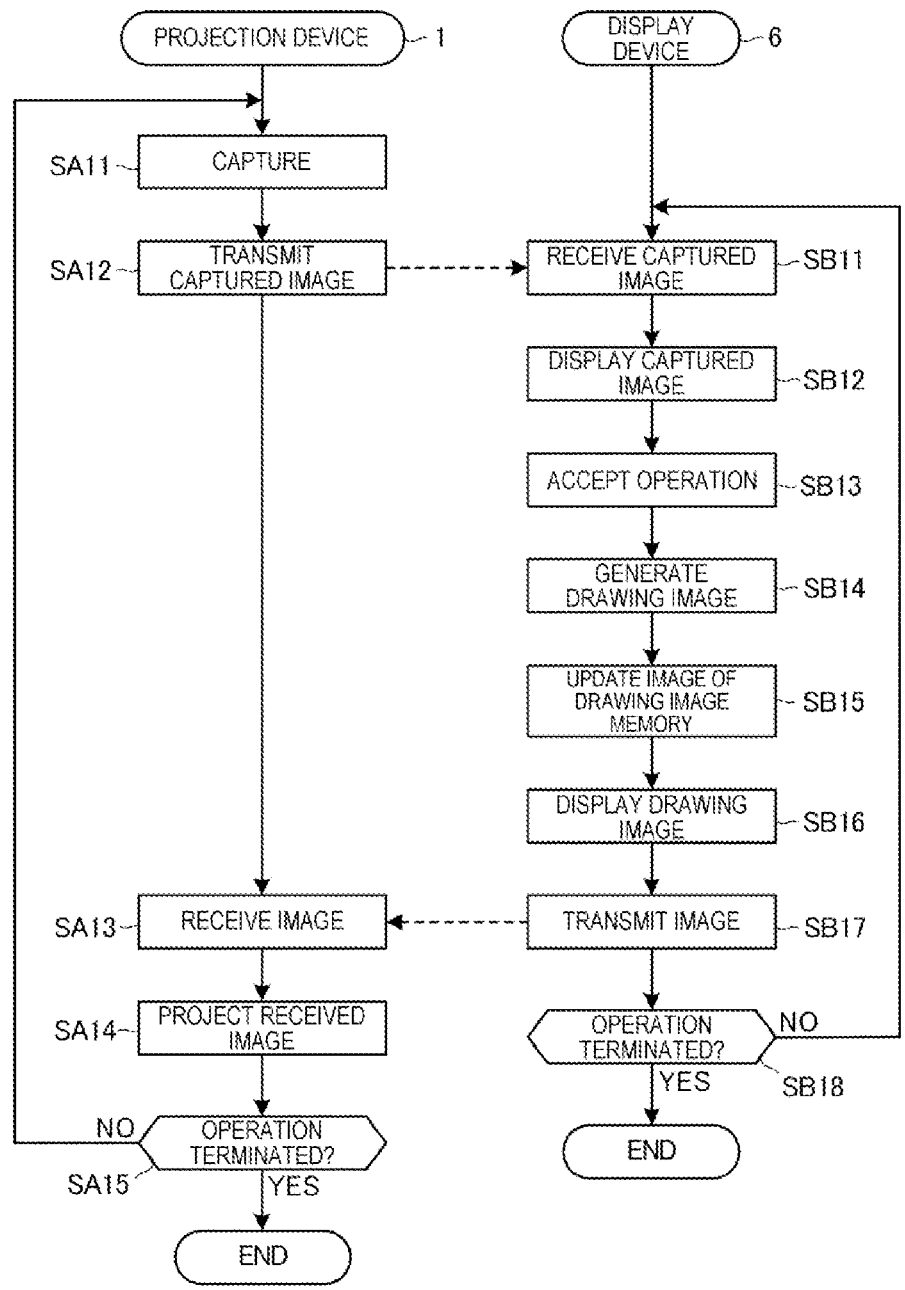
FIG. 5 is a sequence diagram illustrating an operation of the projection system of the first embodiment.
Figure 6:
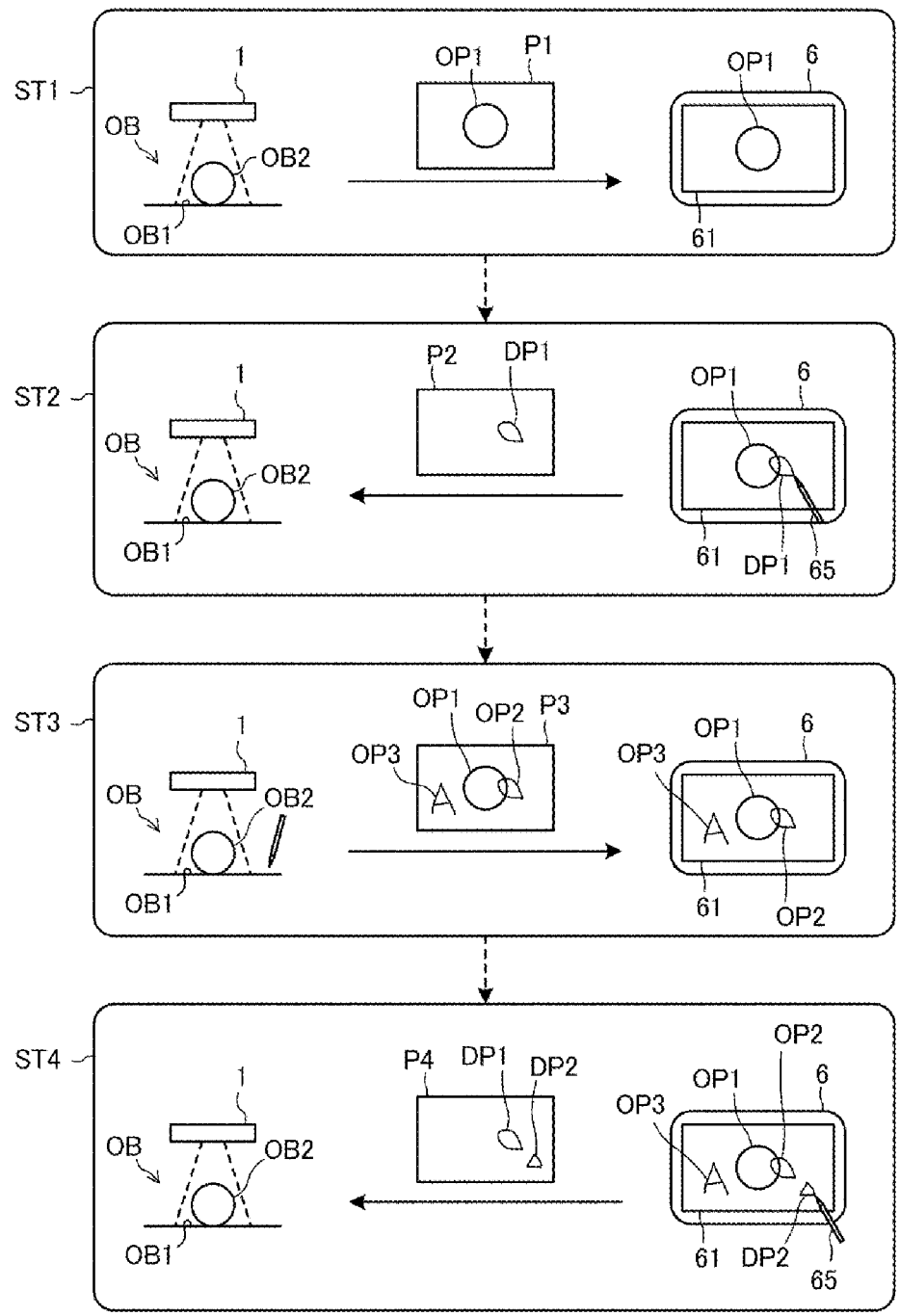
FIG. 6 is a schematic view illustrating an operation of the projection system of the first embodiment.

FIG. 5 is a sequence diagram illustrating an operation of the projection system 100. FIG. 6 is a schematic view of an operation of the projection system 100. An operation of the projection system 100 is described below with reference to these figures.

In FIG. 5, the PJ control unit 20 performs the processes of steps SA11 to SA15, and the DP control unit 70 performs the processes of steps SB11 to SB18.

At step SA11, the projection device 1 captures the range including the projection target OB. At step SA12, the projection device 1 transmits the captured image to the display device 6.

At step SB11, the display device 6 receives the captured image transmitted from the projection device 1. At step SB12, the display device 6 displays the received captured image on the display 61.

Here, when the operation of the instructing member 65 is detected, the display device 6 accepts this operation at step SB13. At step SB14, the display device 6 generates a drawing image on the basis of the operation accepted at step SB13. For example, the display device 6 draws curved lines and straight lines along the movement trajectory of the instructing member 65.

At step SB15, the display device 6 updates the image stored in the drawing image memory 77 on the basis of the drawing image generated at step SB14. For example, the display device 6 combines the drawing image generated at step SB14 with the drawing image stored in the drawing image memory 77 in a superimposed manner, and stores the composite image in the drawing image memory 77.

At step SB16, the display device 6 displays the drawing image generated at step SB14 on the display 61. More specifically, the display device 6 generates a composite image by superimposing the drawing image generated at step SB14 on the captured image displayed at step SB12, and displays it on the composite image the display 61.

At step SB17, the display device 6 transmits, to the projection device 1, the image of the drawing image memory 77 after the update.

At step SA13, the projection device 1 receives the image transmitted by the display device 6. At step SA14, the projection device 1 projects the received image onto the projection target OB with the projection unit 10.

At step SA15, the projection device 1 determines whether to terminate the operation. When it is determined that the operation is to be completed such as when an operation of an instruction to end the operation is detected by the input interface 33 (step SA15; YES), the projection device 1 terminates this process. When it is determined that the operation is not to be completed (step SA15; NO), the projection device 1 returns the process to step SA11.

After transmitting the image to the projection device 1, the display device 6 determines whether to terminate the operation step SB18. When it is determined that the operation is to be completed such as when an operation of an instruction to end the operation is detected by the touch sensor 62 (step SB18; YES), the display device 6 terminates this process. When it is determined that the operation is not to be completed (step SB18; NO), the display device 6 returns the process to step SB11.

FIG. 6 illustrates operation states ST1, ST2, ST3 and ST4 of the projection system 100.

In the projection target OB of the projection device 1, an object OB2 is placed at a plane OB1. Paper or the like is placed at the plane OB1, and the user using the projection device 1 can write letters and diagrams on the plane OB1 with a writing tool such as a pencil.

In the state ST1, the projection device 1 generates a captured image by capturing the plane OB1 and the object OB2. The projection device 1 transmits, to the display device 6, the generated captured image as a first image P1. The first image P1 includes an object image OP1, which is a captured image of the object OB2. The display device 6 receives the first image P1 and displays the first image P1 on the display 61. The display 61 displays the object image OP1.

The state ST2 is a state where an operation is performed with the instructing member 65 in the display device 6. The display device 6 draws a first drawing image DP1 on the basis of the operation of the instructing member 65. As described above with reference to FIG. 5, the display device 6 stores the first drawing image DP1 in the drawing image memory 77. The display device 6 transmits, to the projection device 1, a second image P2 including the first drawing image DP1 as a transmission image. The projection device 1 receives the second image P2, and projects the second image P2 onto the projection target OB.

The state ST3 is a state where a diagram is written on the plane OB1 with a writing tool at the projection device 1. The projection device 1 generates a captured image by capturing the projection target OB, and transmits, to the display device 6, the generated captured image as a third image P3. The third image P3 includes the object image OP1, which is the image of the object OB2, an object image OP2 and an object image OP3. The object image OP2 is an image of the first drawing image DP1 projected by the projection unit 10 on the projection target OB and captured by the image-capturing unit 15. The object image OP3 is an image of a diagram written on the plane OB1 with a writing tool at the projection device 1 and captured by the image-capturing unit 15.

The display device 6 receives the third image P3 and displays the third image P3 on the display 61. The display 61 displays the object images OP1, OP2 and OP3 included in the third image P3. When displaying the third image P3, the display device 6 switches the previous display to the third image P3. As a result, the display of the first drawing image DP1 displayed in the state ST2 is stopped.

The state ST4 is the state where an operation is performed with the instructing member 65 at the display device 6. The display device 6 draws a second drawing image DP2 on the basis of the operation of the instructing member 65. As described above with reference to FIG. 5, the display device 6 updates the image of the drawing image memory 77 on the basis of the second drawing image DP2. In this manner, the drawing image memory 77 stores a composite image obtained by combining the first drawing image DP1 and the second drawing image DP2. That is, the image stored in the drawing image memory 77 after the update includes the first drawing image DP1 and the second drawing image DP2. The display device 6 transmits, to the projection device 1, a fourth image P4 including the image stored in the drawing image memory 77 after the update as a transmission image. The fourth image P4 includes the first drawing image DP1 and the second drawing image DP2. The projection device 1 receives the fourth image P4 and projects the fourth image P4 onto the projection target OB with the projection unit 10.

The first image P1 is a captured image and a transmission image of the projection device 1 and a reception image of the display device 6. The second image P2 is a transmission image of the display device 6 and a reception image and a projection image of the projection device 1. The third image P3 is a captured image and a transmission image of the projection device 1 and a reception image of the display device 6, and the fourth image P4 is a transmission image of the display device 6 and a reception image and a projection image of the projection device 1. The first drawing image DP1 and the second drawing image DP2 are drawing images generated on the basis of the operation of the instructing member 65 at the display device 6.

A feature of the operation illustrated in FIG. 6 is that the display device 6 displays the first image P1 and the third image P3, which are captured images of the projection device 1. In addition, the projection device 1 does not display the first image P1 and the third image P3, which are captured images.

For example, in the state ST3, when the projection device 1 displays a first image P3, which is a captured image, on the display 61 while the display device 6 displays the first drawing image DP1 on the display 61, the object image OP2 and the first drawing image DP1 are displayed at the same position in a superimposed manner. When the positions, shapes and sizes of the object image OP2 and the first drawing image DP1 are different from each other, the display of the display 61 may be disturbed due to the difference between the object image OP2 and the first drawing image DP1. For example, the line making up the object image OP2 and the line making up the first drawing image DP1 may be displayed in a manner like double lines. In addition, for example, the line making up the object image OP2 and the line making up the first drawing image DP1 may be displayed in a state like interference fringes. Such displays lead to reduction of the display quality and reduction of the visibility of the object image OP2 and the first drawing image DP1.

In particular, as illustrated in FIGS. 3 and 4, in the case where a configuration in which a projection optical axis PAX of the projection unit 10 and an image-capturing optical axis IAX of the image-capturing unit 15 are the same axis, i.e., coaxial is employed, the difference in position and size between the object image OP2 and the first drawing image DP1 is extremely small. However, it is highly possible that the positions, shapes and sizes of the object image OP2 and the first drawing image DP1 do not completely coincide with each other. Examples of its cause include a change in brightness of the environment light of the projection device 1, and a difference between the resolution of the projection image of the projection unit 10 and the resolution of the image captured by the image-capturing unit 15. Consequently, the phenomenon in which the line making up the object image OP2 and the line making up the first drawing image DP1 are displayed in a state like interference fringes tends to easily occur.

In the present embodiment, when the display device 6 generates the first drawing image DP1 on the basis of the operation of the instructing member 65, the first drawing image DP1 is not displayed on the display 61 after the second image P2 including the first drawing image DP1 is transmitted to the projection device 1. More specifically, after the third image P3 including the object image OP2 corresponding to the first drawing image DP1 is received, the display device 6 does not display the first drawing image DP1 on the display 61. The same applies to the second drawing image DP2. In this manner, the first drawing image DP1 and the object image OP2 corresponding to the first drawing image DP1 are not displayed in a superimposed manner. Thus, the reduction of the display quality of the image displayed on the display 61 can be prevented.

Then, the display device 6 stores the first drawing image DP1 and the second drawing image DP2 in the drawing image memory 77. In this manner, the first drawing image DP1 and the second drawing image DP2, which are a plurality of drawing images generated at different time points, can be projected with the projection device 1. Thus, an advantage of not losing the drawing image drawn by the user using the display device 6 is achieved.

1-5. Operational Effects of Embodiment

As described above, the projection system 100 described in the first embodiment includes the projection device 1 and the display device 6. The projection device 1 includes the PJ communication unit 42 that communicates with the display device 6, the projection unit 10 that projects an image onto the projection target OB, and the image-capturing unit 15 that captures a range including the projection target OB. The projection device 1 projects the image received by the PJ communication unit 42 with the projection unit 10, and transmits the captured image generated by the image-capturing unit 15 with the PJ communication unit 42. The display device 6 includes the DP communication unit 63 that communicates with the projection device 1, the display 61 that displays the image, and the touch sensor 62 that accepts a drawing operation. The display device 6 displays the captured image received by the DP communication unit 63 on the display, and generates a drawing image on the basis of the drawing operation accepted by the touch sensor 62 while the captured image is being displayed. The display device 6 transmits the generated drawing image with the DP communication unit 63.

With the projection device 1, the control method for the projection system 100 including the projection device 1 and the display device 6 receives an image from the display device 6, projects the received image onto the projection target OB, captures a range including the projection target OB, and transmits the captured image to the display device 6. With the display device 6, this control method receives the captured image from the projection device 1, displays the received captured image on the display 61, generates the drawing image on the basis of the drawing operation, and transmits the generated drawing image to the projection device 1.

In this manner, the state of the projection target OB of the projection device 1 can be displayed on the display device 6, and the image drawn on the basis of the operation of the display device 6 can be projected by the projection device 1. Thus, the state of the projection target OB of the projection device 1 and the details of the drawing operation on the display device 6 can be shared between the user using the projection device 1 and the user using the display device 6.

In the projection system 100, the display device 6 includes the drawing image memory 77 that stores the drawing image. On the basis of the drawing operation accepted by the touch sensor 62, the display device 6 updates the drawing image stored in the drawing image memory 77 and transmits the updated drawing image to the projection device 1.

In this manner, the display device 6 can transmit, to the projection device 1, a plurality of drawing images DP1 and DP2 generated at different timings on the basis of the operation of the instructing member 65. In this manner, it is not necessary to continue the display state of the drawing image DP1. Thus, reduction of the display quality due to overlap of the drawing image and the captured image corresponding to the drawing image can be prevented, and the drawing image drawn through operations of multiple times can be shared between the projection device 1 and the display device 6.

2. Second Embodiment

Figure 7:
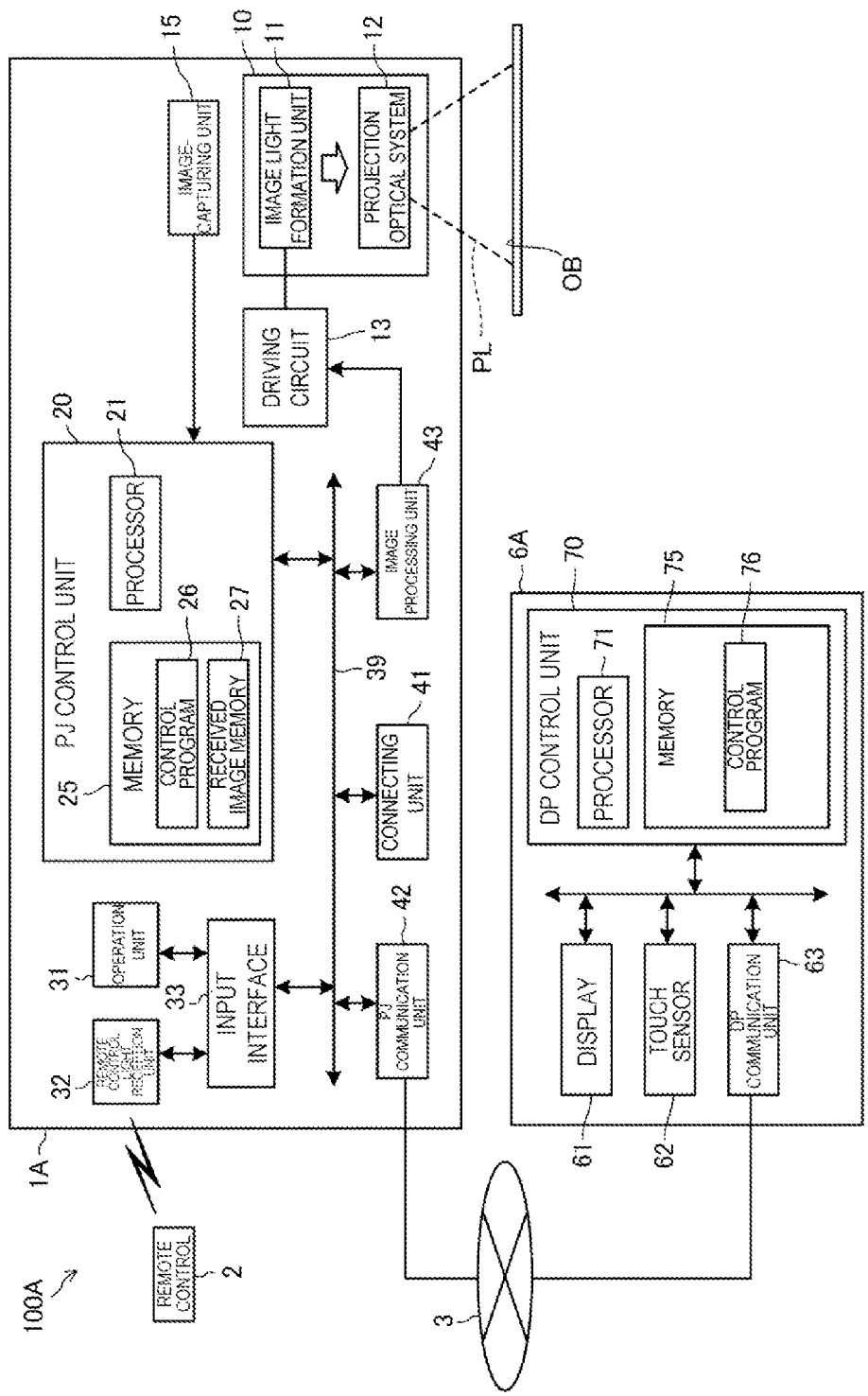
FIG. 7 is a block diagram illustrating each device of a projection system of a second embodiment.
Figure 8:
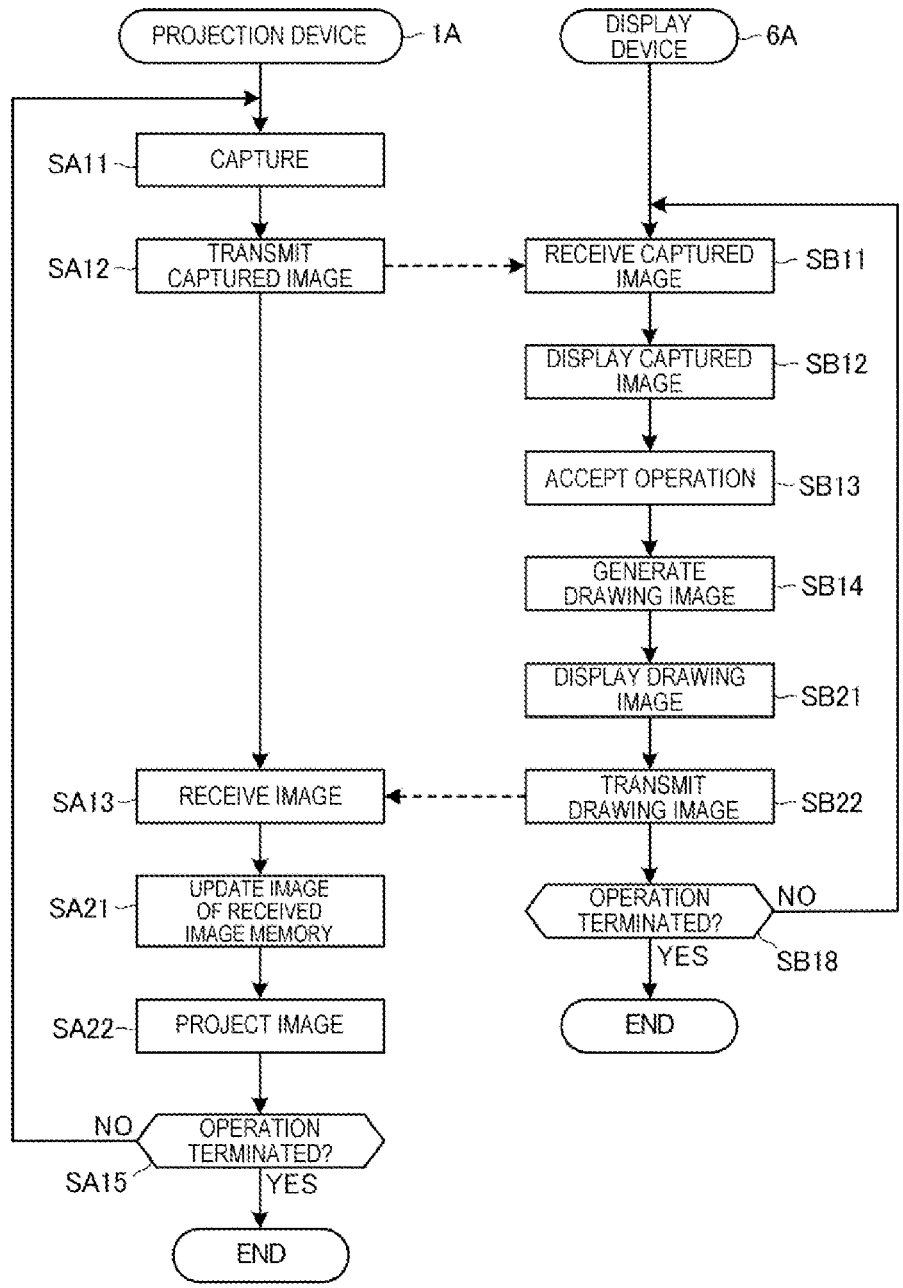
FIG. 8 is a sequence diagram illustrating an operation of the projection system of the second embodiment.
Figure 9:
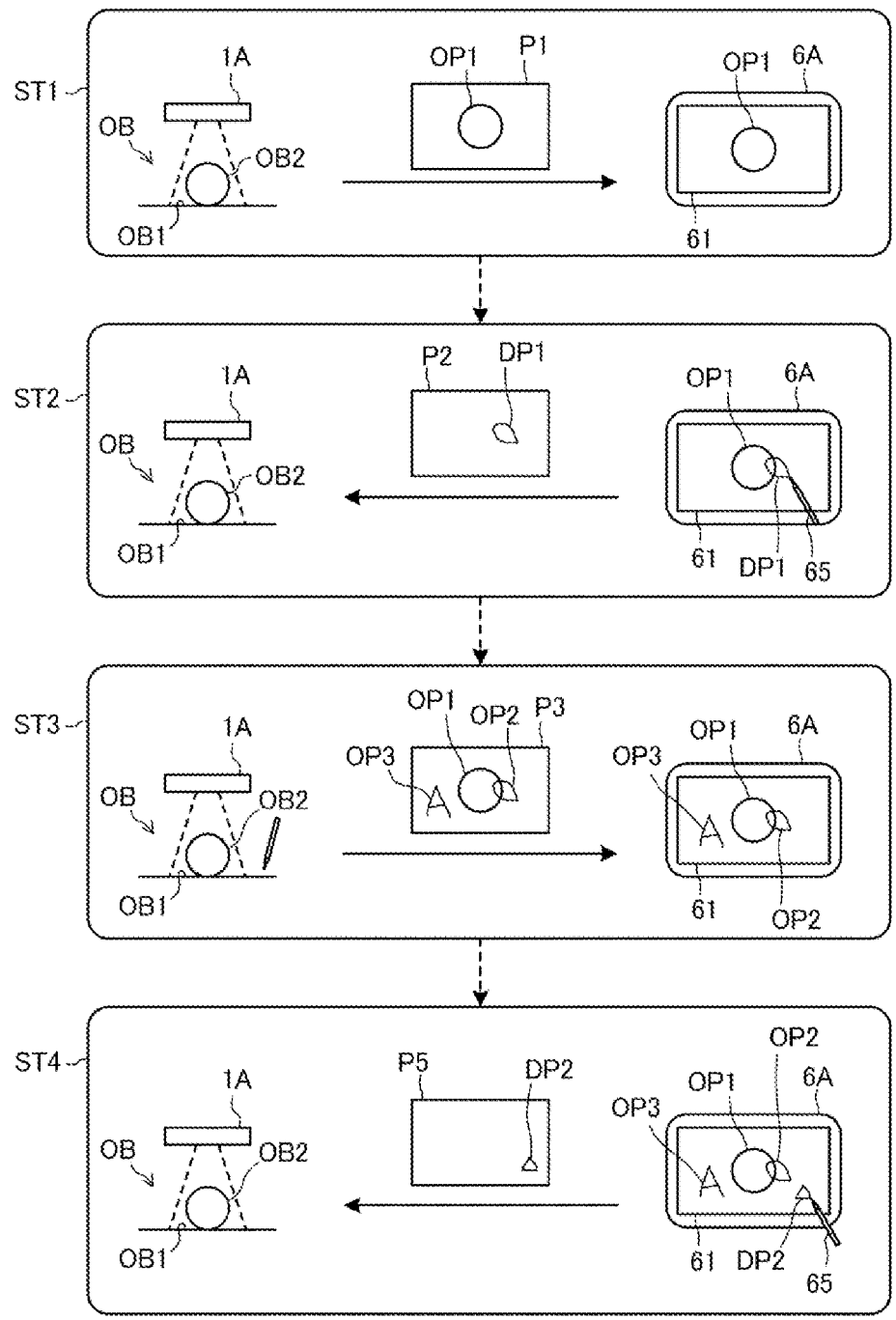
FIG. 9 is a schematic view illustrating an operation of the projection system of the second embodiment.

FIG. 7 is a block diagram of each device of a projection system 100A of the second embodiment. FIG. 8 is a sequence diagram illustrating an operation of the projection system 100A of the second embodiment. FIG. 9 is a schematic view of an operation of the projection system 100A of the second embodiment. With reference to these figures, the second embodiment is described below. In the description of the second embodiment, the same configurations of the projection system 100A as those of the first embodiment are denoted with the same reference numerals, and therefore the description thereof will be omitted. In addition, the same operations of the projection system 100A as those of the first embodiment are described with the same step numbers and the like and the description thereof will be omitted.

The projection system 100A includes a projection device 1A and a display device 6A. The projection device 1A has the same configuration as that of the projection device 1 described in the first embodiment, and differs in that a received image memory 27 is provided in the memory 25. In addition, the display device 6A has the same configuration as that of the display device 6 and differs from the display device 6 in that the drawing image memory 77 is not provided in the memory 75.

The received image memory 27 is a logical or virtual storage region provided using a part of the storage region of the memory 25. The PJ control unit 20 stores, in the received image memory 27, the image received from the display device 6A with the PJ communication unit 42. Each time the image is received from the display device 6A, the PJ control unit 20 updates the image stored in the received image memory 27 by combining the received image with the image stored in the received image memory 27. The PJ control unit 20 projects the image stored in the received image memory 27 with the projection unit 10.

On the other hand, the display device 6A does not include the configuration corresponding to the drawing image memory 77 that is provided in the display device 6. As such, each time a drawing image is generated on the basis of the operation detected by the touch sensor 62, the display device 6A transmits the drawing image to the projection device 1A.

FIG. 8 is a sequence diagram illustrating an operation of the projection system 100. FIG. 9 is a schematic view of an operation of the projection system 100. An operation of the projection system 100 is described below with reference to these figures.

In FIG. 8, the PJ control unit 20 performs the processes of steps SA11, SA12, SA13, SA15, SA21 and SA22, and the DP control unit 70 performs the processes of steps SB11 to SB14, SB18, SB21 and SB22. Among them, the operations of steps SA11 to SA13 and SA15, and the operations of steps SB11 to SB14 and SB18 are the same as the operations described in the first embodiment, and therefore the description thereof will be omitted.

The projection device 1A captures the projection target OB at step SA11, and transmits the captured image to the display device 6A at step SA12.

The display device 6A receives the captured image at step SB11, and displays the received captured image on the display 61 at step SB12. When the operation of the instructing member 65 is accepted at step SB13, the display device 6A generates the drawing image on the basis of the operation at step SB14.

Subsequently, at step SB21, the display device 6A displays the drawing image generated at step SB14 on the display 61. At step SB21, the display device 6A displays the drawing image in a superimposed manner on the captured image displayed on the display 61.

Further, at step SB22, the display device 6A transmits the drawing image generated at step SB14 to the projection device 1A, and proceeds to step SB18.

At step SA13, the projection device 1A receives the image from the display device 6A. The projection device 1A proceeds to step SA21, and updates the image of the received image memory 27 on the basis of the received image.

Specifically, the projection device 1A generates a composite image by combining the image received at step SA13 with the image stored in the received image memory 27. The projection device 1A updates the image of the received image memory 27 by storing the composite image in the received image memory 27.

The projection device 1A proceeds to step SA22, projects the image of the received image memory 27 after the update onto the projection target OB with the projection unit 10, and proceeds to step SA15.

FIG. 9 illustrates the operation states ST1, ST2, ST3 and ST4 of the projection system 100A. The projection target OB of the projection device 1A is composed of the plane OB1 and the object OB2 is placed at it as in the first embodiment.

In the state ST1, the projection device 1A generates a captured image by capturing the plane OB1 and the object OB2, and transmits the first image P1 to the display device 6A. The first image P1 includes an object image OP1, which is a captured image of the object OB2. The display device 6A receives the first image P1 and displays the first image P1 on the display 61. The display 61 displays the object image OP1.

The state ST2 is a state where an operation is performed with the instructing member 65 at the display device 6A. The display device 6A draws the first drawing image DP1 on the basis of the operation of the instructing member 65. The display device 6A displays the first drawing image DP1 on the display 61, and transmits, to the projection device 1A, the second image P2 including the first drawing image DP1 as a transmission image.

The projection device 1A receives the second image P2. The projection device 1A stores the second image P2 in the received image memory 27. When the image is already stored in the received image memory 27, the projection device 1A updates the image stored in the received image memory 27.

The state ST3 is a state where a diagram is written on the plane OB1 with a writing tool at the projection device 1A. The projection device 1A captures the projection target OB and transmits the third image P3 to the display device 6A. The third image P3 includes the object image OP1, which is the image of the object OB2, an object image OP2 and an object image OP3. The object image OP2 is an image of the first drawing image DP1 projected by the projection unit 10 on the projection target OB and captured by the image-capturing unit 15. The object image OP3 is an image obtained by capturing, with the image-capturing unit 15, the diagram written on the plane OB1 with a writing tool at the projection device 1.

The display device 6A receives the third image P3 and displays the third image P3 on the display 61. The display 61 displays the object images OP1, OP2 and OP3 included in the third image P3. When displaying the third image P3, the display device 6A switches the previous display to the third image P3. As a result, the display of the first drawing image DP1 displayed in the state ST2 is stopped.

The state ST4 is a state where an operation is performed with the instructing member 65 at the display device 6A. The display device 6A draws the second drawing image DP2 on the basis of the operation of the instructing member 65. The display device 6A transmits, to the projection device 1A, a fourth image P5 including the second drawing image DP2 as a transmission image.

The projection device 1A receives the fourth image P5, and updates the image stored in the received image memory 27 on the basis of the fourth image P5. In this manner, the image stored in the received image memory 27 is updated to an image in which the first drawing image DP1 and the second drawing image DP2 are superimposed on each other. The projection device 1A projects, onto the projection target OB, the image stored in the received image memory 27. In this manner, the first drawing image DP1 and the second drawing image DP2 are projected onto the projection target OB.

The first image P1 is a captured image and a transmission image of the projection device 1A and a reception image of the display device 6A. The second image P2 is a transmission image of the display device 6A and a reception image and a projection image of the projection device 1A. The third image P3 is a captured image and a transmission image of the projection device 1A and a reception image of the display device 6A, and the fourth image P5 is a transmission image of the display device 6A and a reception image and a projection image of the projection device 1A. The first drawing image DP1 and the second drawing image DP2 are drawing images generated on the basis of the operation of the instructing member 65 at the display device 6A.

In this manner, in the projection system 100A described in the second embodiment, the projection device 1A includes the received image memory 27 that stores the image received by the PJ communication unit 42. The projection device 1A updates the image stored in the received image memory 27 on the basis of the image received by the PJ communication unit 42, and projects the image updated in the received image memory 27 with the projection unit 10. The projection device 1A does not display the first image P1 and the third image P3, which are captured images.

With the projection system 100A of the second embodiment, the state of the projection target OB of the projection device 1A can be displayed with the display device 6A, and the image drawn on the basis of the operation of the display device 6A can be projected with the projection device 1A. In this manner, the user using the projection device 1A and the user using the display device 6A can share the state of the projection target OB of the projection device 1A and the details of the drawing operation on the display device 6A. Further, with the projection system 100A, the projection device 1A can store, in the received image memory 27, the plurality of drawing images DP1 and DP2 generated at different timings by the display device 6A. In this manner, even in the case where the display device 6A does not have the configuration of storing the drawing images DP1 and DP2, the projection device 1A can project the plurality of the drawing images DP1 and DP2 generated at different timings. Thus, reduction of the display quality due to overlap of the drawing image and the captured image corresponding to the drawing image can be prevented, and the drawing image drawn through operations of multiple times can be shared between the projection device 1A and the display device 6A.

3. Third Embodiment

Figure 10:
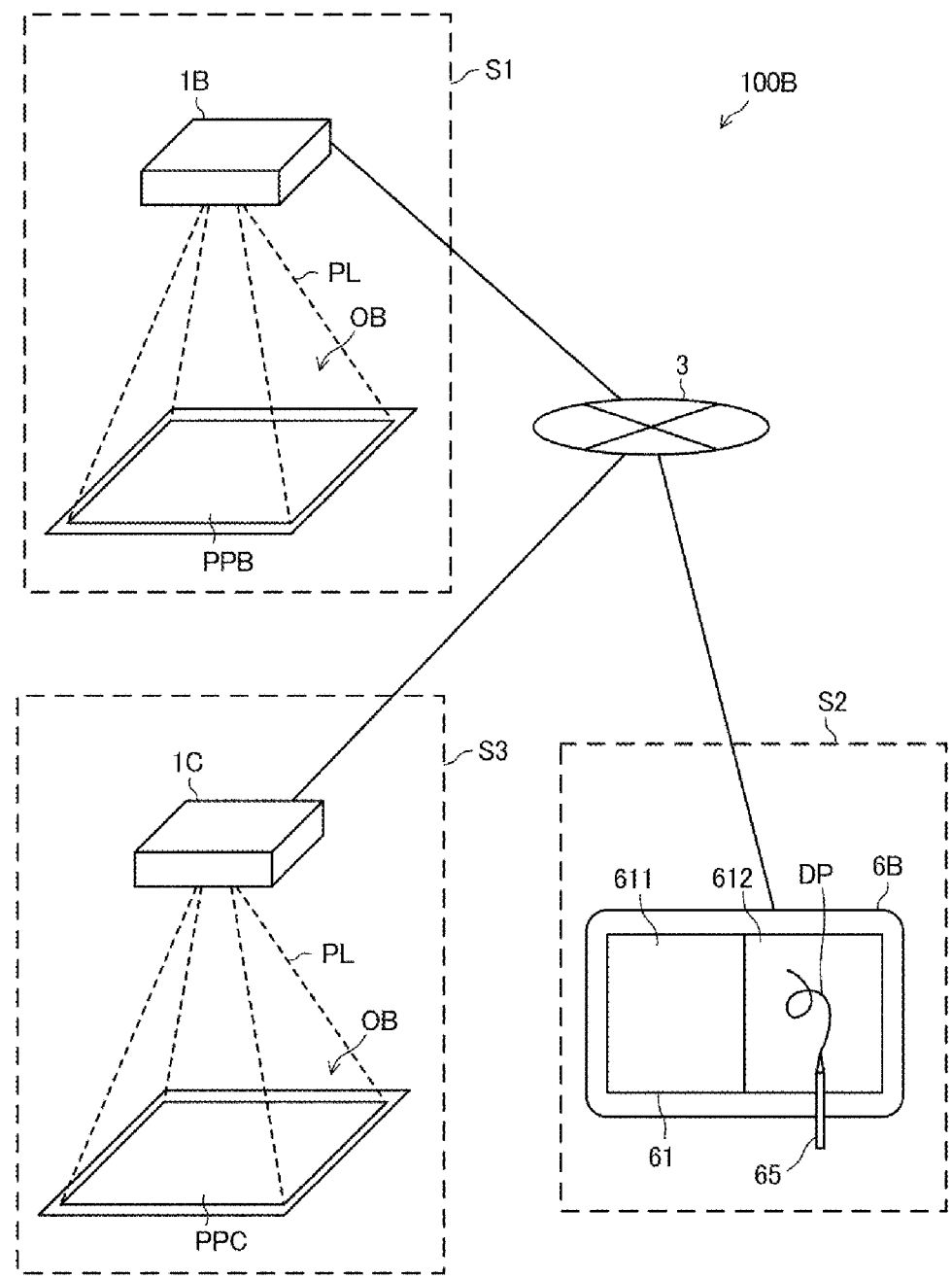
FIG. 10 is a diagram illustrating a schematic configuration of a projection system of a third embodiment.
Figure 11:
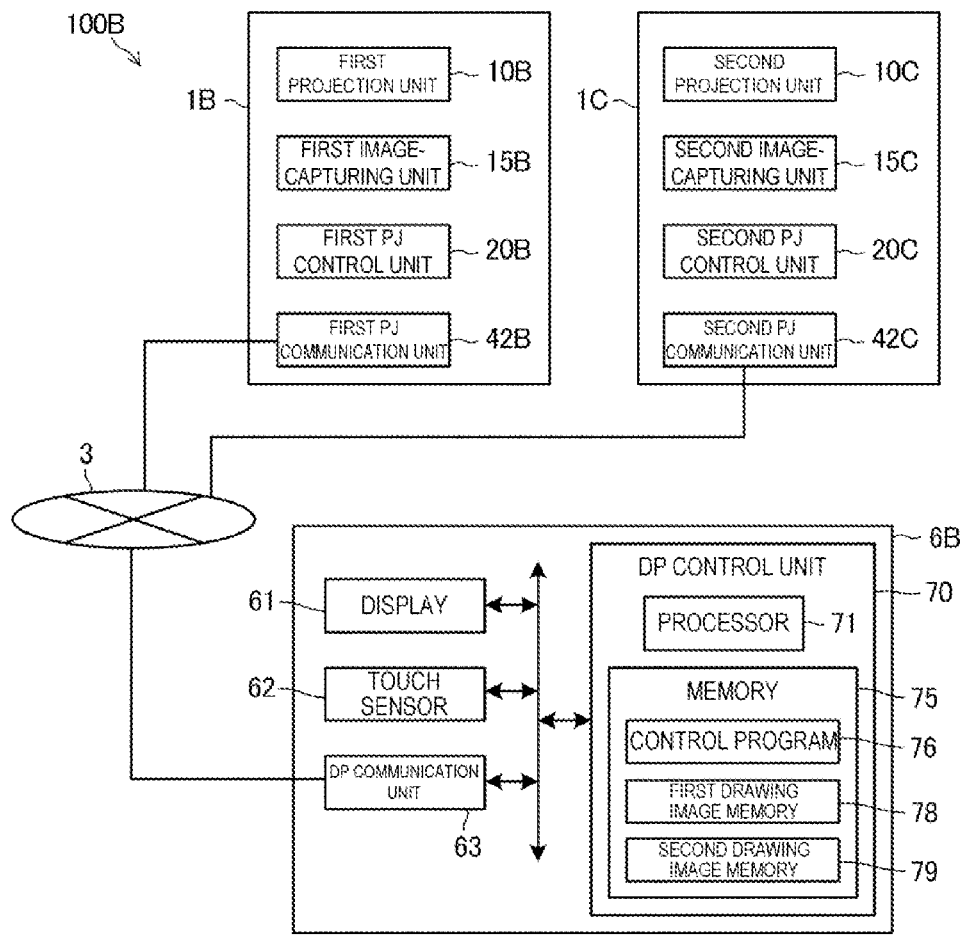
FIG. 11 is a block diagram illustrating each device of the projection system of the third embodiment.
Figure 12:
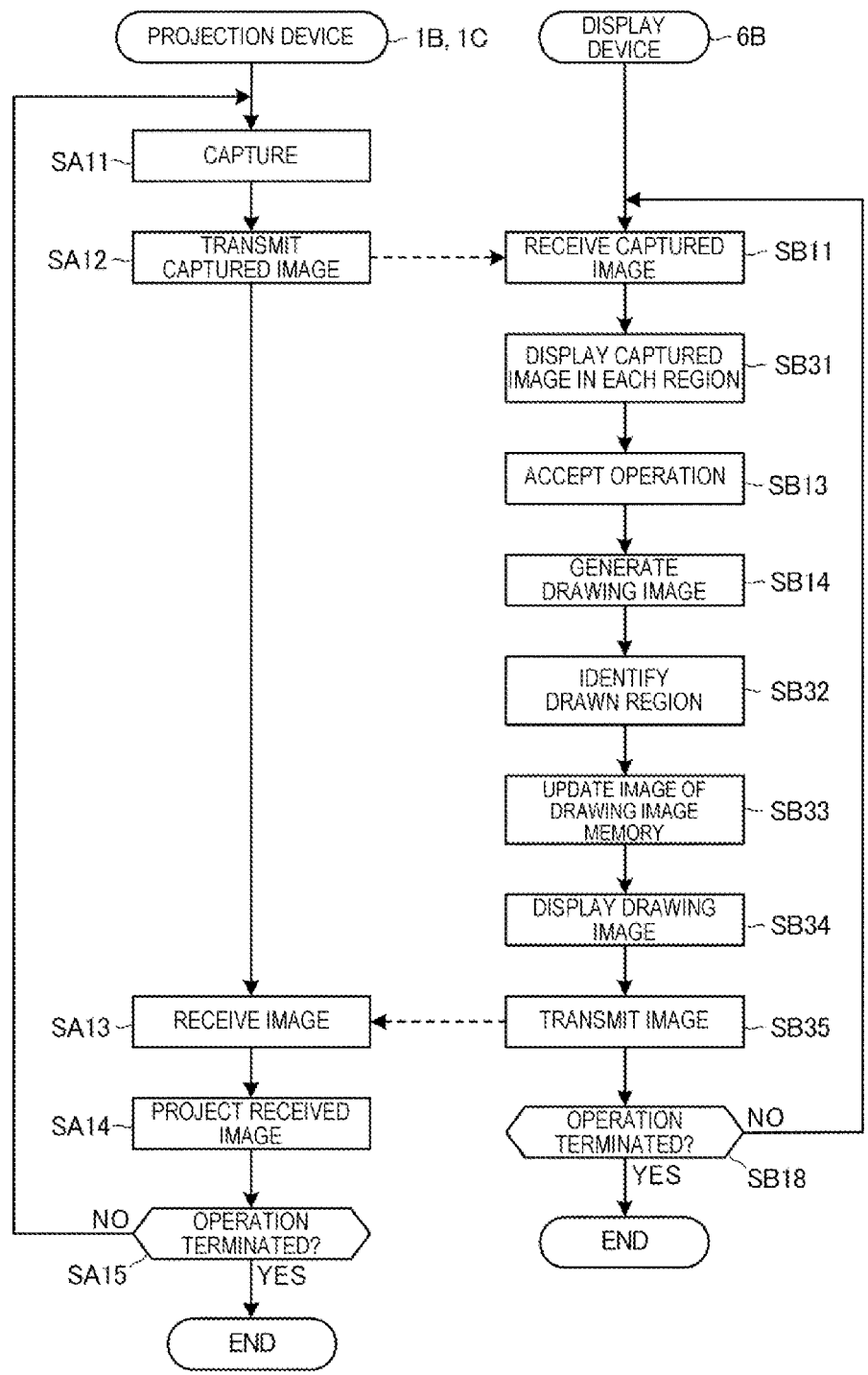
FIG. 12 is a sequence diagram illustrating an operation of the projection system of the third embodiment.
Figure 13:
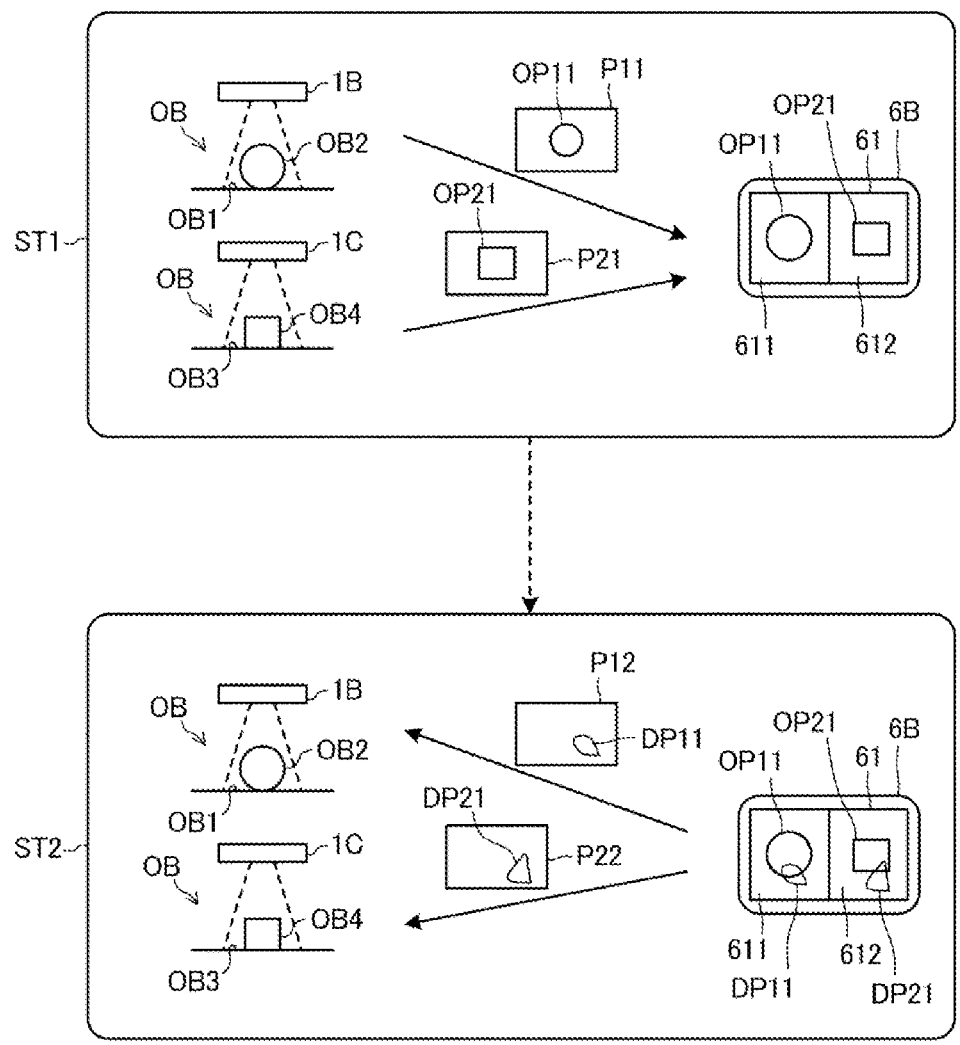
FIG. 13 is a schematic view illustrating an operation of the projection system of the third embodiment.

FIG. 10 is a diagram illustrating a schematic configuration of a projection system 100B of a third embodiment. FIG. 11 is a block diagram of each device of the projection system 100B of the third embodiment. FIG. 12 is a sequence diagram illustrating an operation of the projection system 100B of the third embodiment. FIG. 13 is a schematic view of an operation of the projection system 100B of the third embodiment. With reference to these figures, the third embodiment is described below. In the description of the third embodiment, the same configurations of the projection system 100B as those of the first embodiment or the second embodiment are denoted with the same reference numerals, and therefore the description thereof will be omitted. In addition, the same operations of the projection system 100B as those of the first embodiment or second embodiment are described with the same step numbers and the like and the description thereof will be omitted.

As illustrated in FIG. 10, the projection system 100B includes projection devices 1B and 1C and a display device 6B. The projection devices 1B and 10 and the display device 6B are connected to the communication network 3. The projection devices 1B and 10 and the display device 6B are connected to each other through the communication network 3 so as to enable mutual data communication. The projection device 1B corresponds to an example of the first projection device, and the projection device 10 corresponds to an example of the second projection device.

The projection device 1B is installed at the use location S1, and the projection device 10 is installed at a use location S3. In addition, the display device 6B is installed at the use location S2. The use locations S1, S2 and S3 are not limited, and may be separated from each other or adjacent to each other.

The projection device 1B has the same configuration as that of the projection device 1 described in the first embodiment. The same applies to the projection device 10. As illustrated in FIG. 11, the projection devices 1B and 10 have configurations corresponding to the projection unit 10, the image-capturing unit 15, the PJ control unit 20 and the PJ communication unit 42 of the projection device 1. In the present embodiment, for the purpose of discrimination of the configurations, the projection unit 10 provided in the projection device 1B is referred to as first projection unit 10B. Likewise, the image-capturing unit 15, the PJ control unit 20, and the PJ communication unit 42 provided in the projection device 1B are referred to as first image-capturing unit 15B, first PJ control unit 20B, and first PJ communication unit 42B, respectively. In addition, the projection unit 10, the image-capturing unit 15, the PJ control unit 20, and the PJ communication unit 42 provided in the projection device 10 are referred to as second projection unit 100, second image-capturing unit 15C, second PJ control unit 20C, and second PJ communication unit 42C, respectively. These configurations are as described in the first embodiment.

As with the display device 6 described in the first embodiment, the display device 6B includes the display 61, the touch sensor 62, the DP communication unit 63, and the DP control unit 70. The difference between the display device 6 and the display device 6A is that the display device 6A includes a first drawing image memory 78 and a second drawing image memory 79 in the memory 75. The first drawing image memory 78 and the second drawing image memory 79 are logical or virtual storage regions using a part of the storage region of the memory 75.

As illustrated in FIG. 10, the display device 6B is provided with two display regions 611 and 612 in the display 61. The display device 6B displays different images on the display region 611 and the display region 612. In the present embodiment, the display region 611 is a display region corresponding to the projection device 1B and the display region 612 is a display region corresponding to the projection device 1C. The display region 611 corresponds to an example of the first region and the display region 612 corresponds to an example of the second region.

With the first image-capturing unit 15B, the projection device 1B captures the capturing range including the projection target OB of the projection device 1B. The projection device 1B transmits the captured image of the first image-capturing unit 15B to the display device 6B. In addition, with the second image-capturing unit 15C, the projection device 10 captures the capturing range including the projection target OB of the projection device 10 and transmits the captured image to the display device 6B.

The display device 6B displays, on the display region 611, the captured image received from the projection device 1B, and displays, on the display region 612, the captured image received from the projection device 10.

The display region 611 is an operation region corresponding to the projection device 1B, and the display region 612 is an operation region corresponding to the projection device 10. When an operation with the instructing member 65 or the like on the display region 611 is accepted, the display device 6B generates the drawing image DP corresponding to the projection device 1B on the basis of the operation. In this case, the display device 6B transmits the image including the drawing image DP to the projection device 1B. When an operation with the instructing member 65 or the like on the display region 612 is accepted, the display device 6B generates the drawing image DP corresponding to the projection device 10 on the basis of the operation. In this case, the display device 6B transmits the image including the drawing image DP to the projection device 10. The projection device 1B projects the image received from the display device 6B onto the projection target OB with the first projection unit 10B. The projection device 10 projects, onto the projection target OB, the image received from the display device 6B with the second projection unit 100.

An operation of the projection system 100B is described below with reference to FIG. 12.

In FIG. 12, the first PJ control unit 20B and the second PJ control unit 20C perform the respective processes of steps SA11 to SA15. The DP control unit 70 performs the processes of steps SB11, SB13, SB14, SB18 and SB31 to SA35. The operations of steps SA11 to SA15 and the operations of steps SB11, SB13, SB14 and SB18 are the same as the operations described in the first embodiment, and therefore the description thereof will be omitted.

The projection device 1B captures the projection target OB at step SA11 and transmits the captured image to the display device 6B at step SA12.

The display device 6B receives the captured image at step SB11. At step SB31, the display device 6B displays the captured image received at step SB11 on the display region 611 or the display region 612. Specifically, the display device 6B displays, on the display region 611, the image received from the projection device 1B at step SB11, and displays, on the display region 612, the image received from the projection device 10.

When the operation of the instructing member 65 is accepted at step SB13, the display device 6B generates the drawing image on the basis of the operation at step SB14.

Subsequently, at step SB32, the display device 6B determines the region corresponding to the drawing image generated at step SB14. Specifically, the display device 6B determines whether the drawing image generated at step SB14 corresponds to the display region 611 or the display region 612.

At step SB33, on the basis of the image generated at step SB14, the display device 6B updates the image of the first drawing image memory 78 or the second drawing image memory 79. Specifically, when the image generated at step SB14 is an image generated based on the operation performed on the display region 611, the display device 6B updates the image stored in the first drawing image memory 78. In this case, the display device 6B generates a composite image by combining the image generated at step SB14 with the image stored in the first drawing image memory 78. The display device 6B updates the image stored in the first drawing image memory 78 with the composite image. In addition, when the image generated at step SB14 is an image generated based on an operation performed on the display region 612, the display device 6B updates the image stored in the second drawing image memory 79. In this case, the display device 6B generates a composite image by combining the image generated at step SB14 with the image stored in the second drawing image memory 79. The display device 6B updates the image stored in the second drawing image memory 79 with the composite image.

At step SB34, the display device 6B displays the drawing image on the display 61 on the basis of the determination result of step SB32. At step SB34, the display device 6B displays, on the display region 611, the drawing image generated based on the operation performed on the display region 611, and displays, on the display region 612, the drawing image generated based on the operation performed on the display region 612. At step SB34, the display device 6B may display the drawing image in a superimposed manner on the captured image that is already displayed on the display 61.

At step SB35, the display device 6B performs at least one of an operation of transmitting the image stored in the first drawing image memory 78 to the projection device 1B and an operation of transmitting the image stored in the second drawing image memory 79 to the projection device 1C. Specifically, when the image stored in the first drawing image memory 78 is updated at step SB33, the display device 6B transmits the image to the projection device 1B at step SB35. When the image stored in the second drawing image memory 79 is updated at step SB33, the display device 6B transmits the image to the projection device 10 at step SB35. Thereafter, the display device 6B proceeds to step SB18.

At step SA13, the projection device 1B receives the image from the display device 6B, projects the received image with the first projection unit 10B at step SA14, and proceeds to step SA15.

The projection device 10 captures the projection target OB at step SA11, and transmits the captured image to the display device 6B at step SA12. At step SA13, the projection device 10 receives the image from the display device 6B, projects the received image with the second projection unit 100 at step SA14, and proceeds to step SA15.

FIG. 13 illustrates the operation states ST1 and ST2 of the projection system 100B. The projection target OB of the projection devices 1B and 1C is composed of the plane OB1 and the object OB2 is placed at it as in the projection device 1 described in the first embodiment.

In the state ST1, the projection device 1B generates a captured image by capturing the plane OB1 and the object OB2, and transmits a first captured image P11 to the display device 6B. The first captured image P11 includes an object image OP11, which is a captured image of the object OB2. The projection device 10 generates a captured image by capturing the plane OB1 and the object OB2, and transmits a second captured image P21 to the display device 6B. The second captured image P21 includes an object image OP21, which is a captured image of an object OB4 placed at the projection target OB of the projection device 1C. The first captured image P11 corresponds to an example of the captured image generated by the projection device 1B, and the second captured image P21 corresponds to an example of the captured image generated by the projection device 10.

The display device 6B receives the first captured image P11 and displays the first captured image P11 in the display region 611 of the display 61. In addition, the display device 6B receives the second captured image P21 and displays the second captured image P21 in the display region 612. The display 61 displays the object image OP11, which is the image of the object OB2, in the display region 611, and the object image OP21, which is the image of the object OB4, in the display region 612.

The state ST2 is a state where an operation is performed with the instructing member 65 at the display device 6B. The display device 6B draws a first region drawing image DP11 on the basis of the operation performed on the display region 611. The display device 6B generates a first transmission image P12 including the first region drawing image DP11, and transmits the first transmission image P12 to the projection device 1B. In addition, the display device 6B draws a second region drawing image DP21 on the basis of an operation performed on the display region 612. The display device 6B generates a second transmission image P22 including the second region drawing image DP21, and transmits a transmission image P22 to the projection device 10. The first region drawing image DP11 corresponds to an example of the drawing image in the display region 611 of the display device 6B, and the second region drawing image DP21 of the display device 6B corresponds to an example of the drawing image in the display region 612. In addition, the first transmission image P12 corresponds to an example of the transmission image transmitted from the display device 6B to the projection device 1B, and the second transmission image P22 corresponds to an example of the transmission image transmitted from the display device 6B to the projection device 10.

The projection device 1B receives the first transmission image P12 and projects the first transmission image P12 with the first projection unit 10B. The projection device 10 receives the second transmission image P22 and projects the second transmission image P22 with the second projection unit 100.

In the state ST2, the display device 6B updates the image stored in the first drawing image memory 78 on the basis of the first region drawing image DP11. In addition, the display device 6B updates the image stored in the second drawing image memory 79 on the basis of the second region drawing image DP21.

As described above, the projection system 100B described in the third embodiment is a system including the projection device 1B, the projection device 1C and the display device 6B. The projection device 1B includes the first projection unit 10B, the first image-capturing unit 15B, and the first PJ communication unit 42B. With the first projection unit 10B, the projection device 1B projects the image received by the first PJ communication unit 42B from the display device 6B. The projection device 1B generates the first captured image by capturing a range including the projection target OB of the first projection unit 10B with the first image-capturing unit 15B, and transmits the first captured image with the first PJ communication unit 42B. The projection device 10 includes the second projection unit 100, the second image-capturing unit 15C, and the second PJ communication unit 42C. With the second projection unit 100, the projection device 1C projects the image received from the display device 6B with the second PJ communication unit 42C. The projection device 10 generates the second captured image by capturing a range including the projection target OB of the second projection unit 100 with the second image-capturing unit 15C, and transmits the second captured image with the second PJ communication unit 42C. The display device 6B includes the display 61, the touch sensor 62, and the DP communication unit 63. With the DP communication unit 63, the display device 6B communicates with the projection device 1B and the projection device 10. The display device 6B displays the first captured image received from the projection device 1B in the display region 611 of the display 61. The display device 6B generates the first region drawing image on the basis of the drawing operation corresponding to the display region 611 accepted by the touch sensor 62, and transmits the first region drawing image to the projection device 1B. The display device 6B displays the second captured image received from the projection device 10 in the display region 612 of the display 61. The display device 6B generates the second region drawing image on the basis of the drawing operation corresponding to the display region 612 accepted by the touch sensor 62, and transmits the second region drawing image to the projection device 10.

In the control method for the projection system 100B, the projection device 1B receives the image from the display device 6B with the first PJ communication unit 42B, and projects the received image onto the projection target OB with the first projection unit 10B. The projection device 1B generates the first captured image by capturing a range including the projection target OB of the first projection unit 10B with the first image-capturing unit 15B, and transmits the first captured image with the first PJ communication unit 42B. The projection device 10 receives the image from the display device 6B with the second PJ communication unit 42C, and projects the image received by the second PJ communication unit 42C from the display device 6B, with the second projection unit 100. The projection device 10 generates the second captured image by capturing a range including the projection target OB of the second projection unit 100 with the second image-capturing unit 15C, and transmits the second captured image with the second PJ communication unit 42C. With the DP communication unit 63, the display device 6B communicates with the projection device 1B and the projection device 10, and displays the first captured image received from the projection device 1B in the display region 611 of the display 61. The display device 6B generates the first region drawing image on the basis of the drawing operation corresponding to the display region 611 accepted by the touch sensor 62, and transmits the first region drawing image to the projection device 1B. The display device 6B displays, in the display region 612 of the display 61, the second captured image received from the projection device 10, generates the second region drawing image on the basis of the drawing operation corresponding to the display region 612 accepted by the touch sensor 62, and transmits the second region drawing image to the projection device 10.

In this manner, the state of the projection target OB of the projectors 1B and 10 can be displayed by the display device 6B, and the image drawn on the basis of the operation of the display device 6B can be projected by the projectors 1B and 10. In this manner, the user using the projectors 1B and 1C and the user using the display device 6B can share the state of the projection target OB of the projectors 1B and 1C and the details of the drawing operation for the display device 6B.

Further, the projection device 1B shares, with the display device 6B, the drawing image generated through an operation performed on the display region 611 at the display device 6B. On the other hand, the projection device 10 shares, with the display device 6B, the drawing image generated through an operation performed on the display region 612 at the display device 6B. In this manner, one display device 6B can individually share the image with the plurality of projection devices 1B and 10.

The display device 6B includes the first drawing image memory 78 that stores the first drawing image, and the second drawing image memory 79 that stores the second drawing image. The display device 6B updates the first drawing image stored in the first drawing image memory 78 on the basis of the drawing operation corresponding to the display region 611, and transmits the updated first drawing image to the projection device 1B. The display device 6B updates the second drawing image stored in the second drawing image memory 79 on the basis of the drawing operation corresponding to the display region 612, and transmits the updated second drawing image to the projection device 10.

In this manner, the display device 6B stores, in the first drawing image memory 78, the first the drawing image DP1 generated in accordance with the operation performed on the display region 611, and stores, in the second drawing image memory 79, the second drawing image DP2 generated in accordance with the operation performed on the display region 612. In this manner, a plurality of drawing images generated at different timings by the display device 6A can be held by the display device 6B in a manner corresponding to each of the plurality of the projection devices 1B and 10. Thus, reduction of the display quality due to overlap of the drawing image and the captured image corresponding to the drawing image can be prevented, and the drawing image drawn through operations of multiple times can be shared between the projection devices 1B and 10 and the display device 6B.

4. Fourth Embodiment

Figure 14:
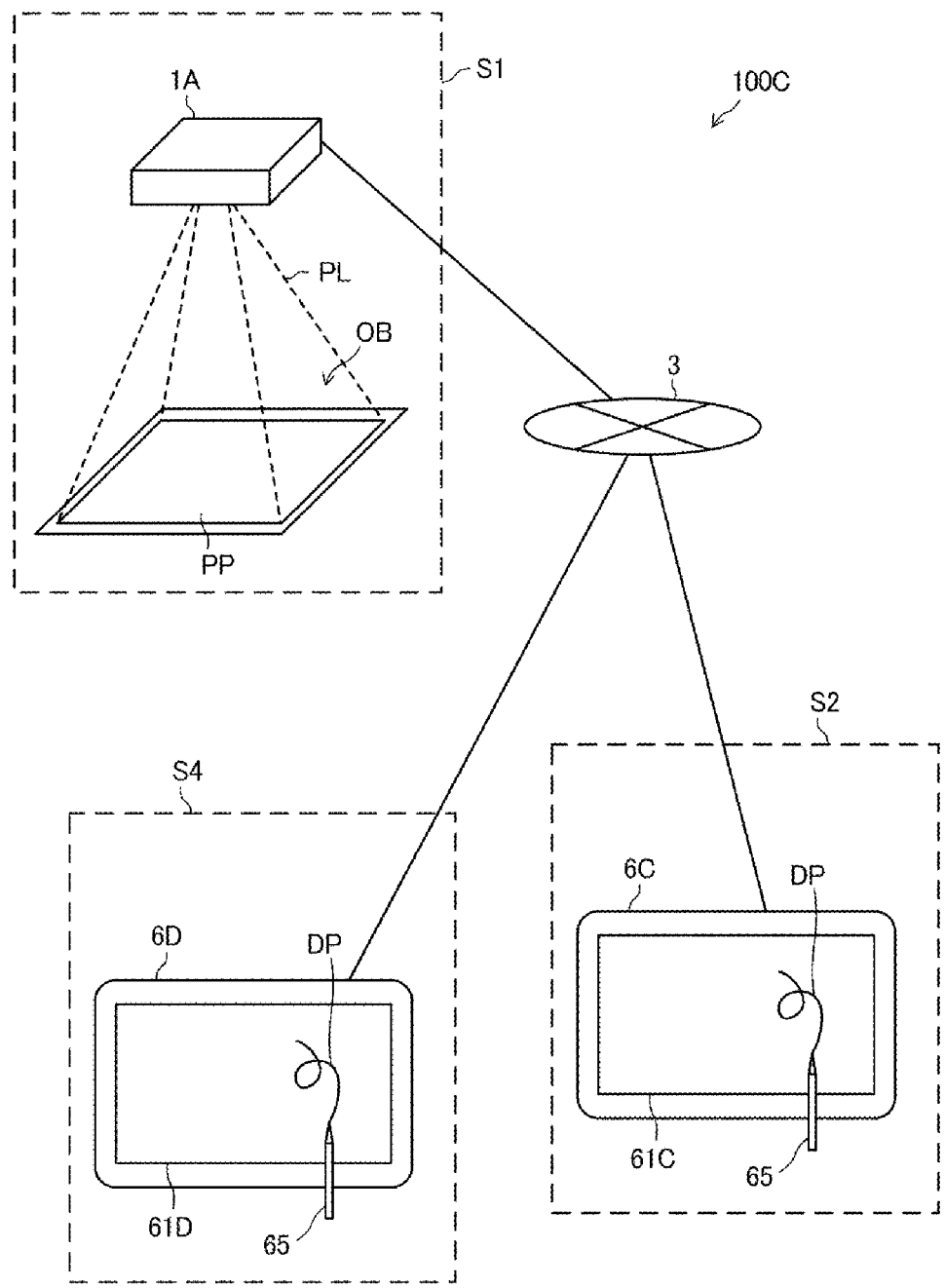
FIG. 14 is a diagram illustrating a schematic configuration of a projection system of a fourth embodiment.
Figure 15:
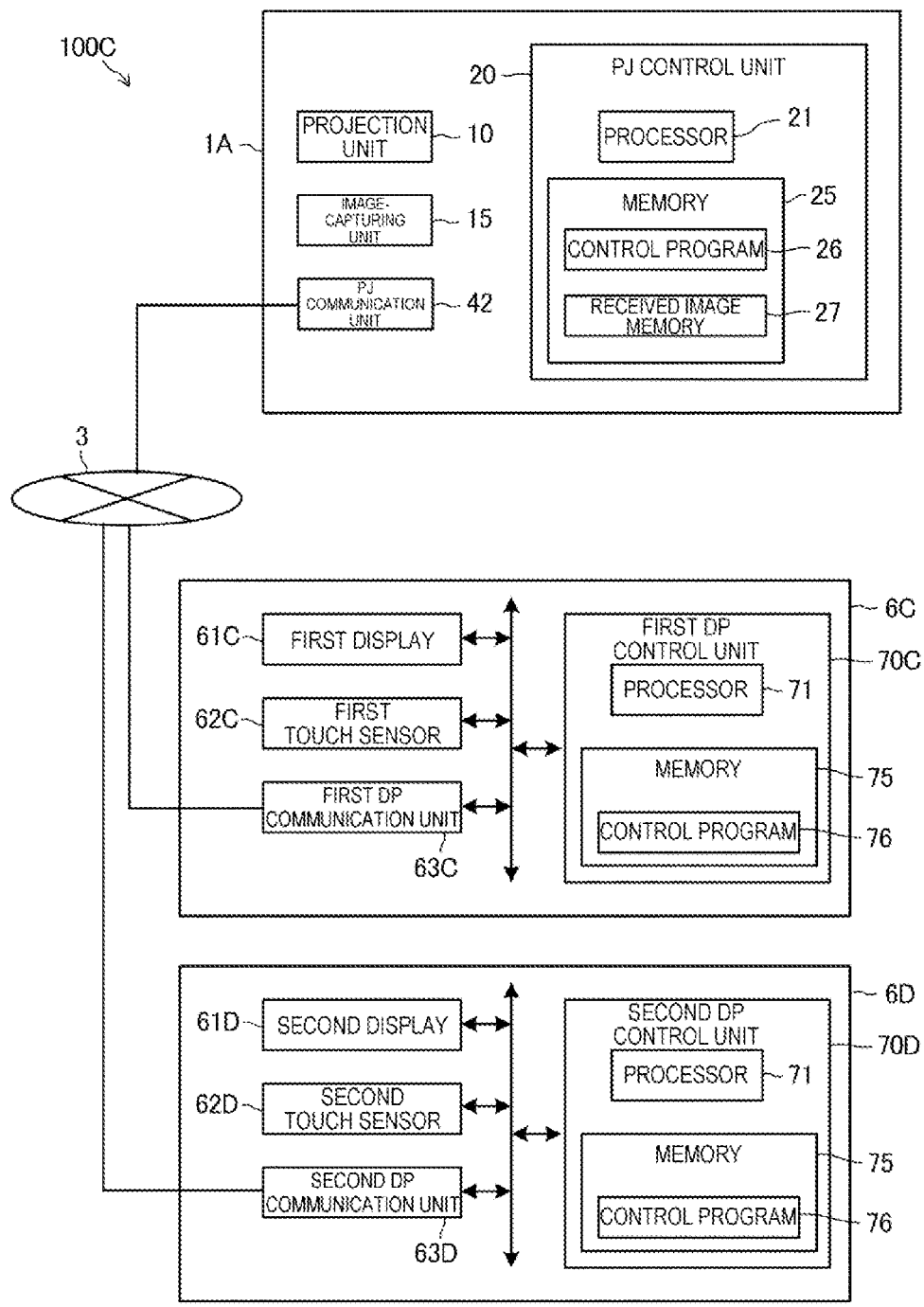
FIG. 15 is a block diagram illustrating each device of the projection system of the fourth embodiment.
Figure 16:
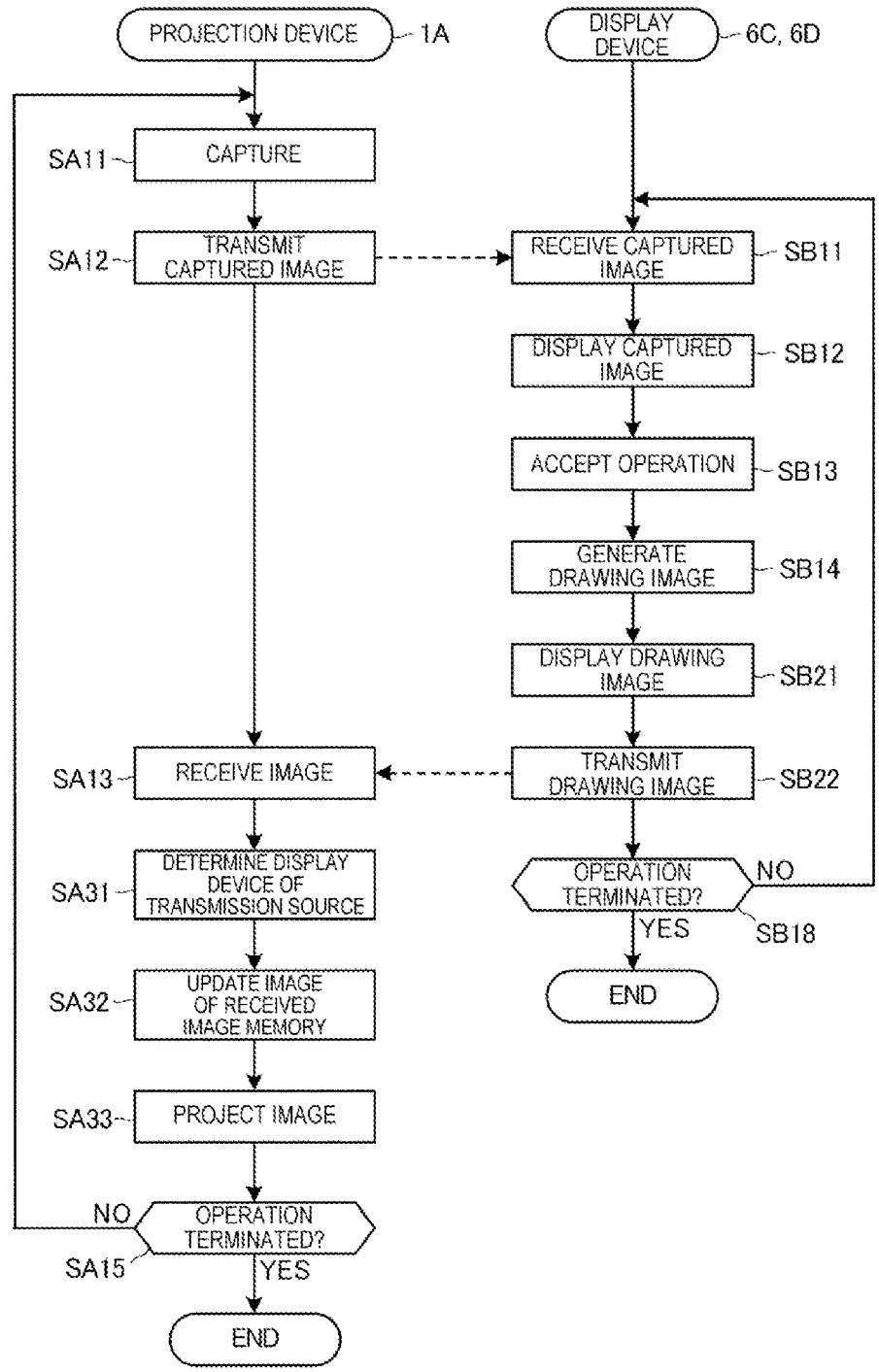
FIG. 16 is a sequence diagram illustrating an operation of the projection system of the fourth embodiment.
Figure 17:
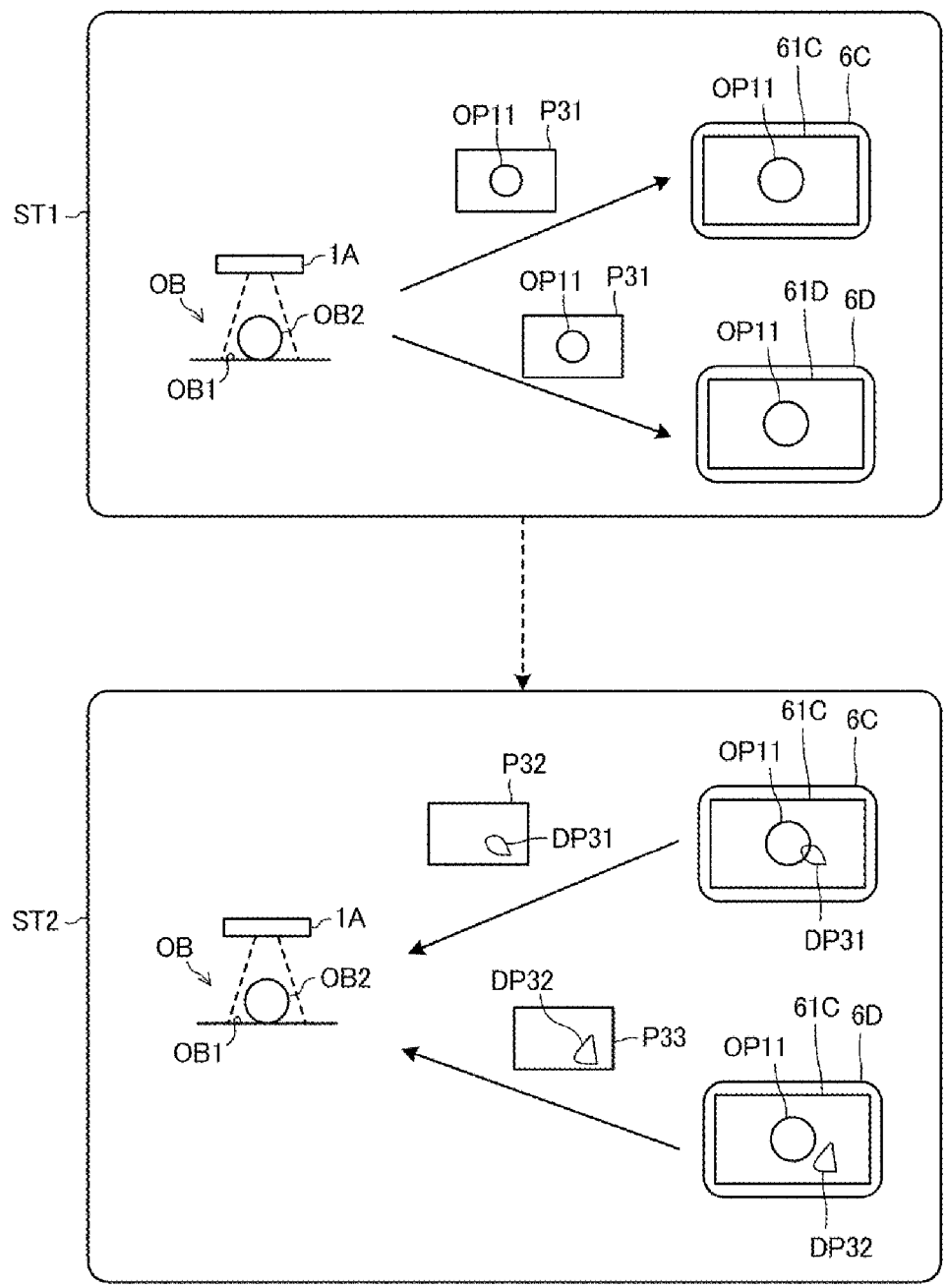
FIG. 17 is a schematic view illustrating an operation of the projection system of the fourth embodiment.

FIG. 14 is a diagram illustrating a schematic configuration of a projection system 100C of a fourth embodiment. FIG. 15 is a block diagram of each device of the projection system 100C of the fourth embodiment. FIG. 16 is a sequence diagram illustrating an operation of the projection system 100C of the fourth embodiment. FIG. 17 is a schematic view of an operation of the projection system 100C of the fourth embodiment. With reference to these figures, the fourth embodiment is described below. In the description of the fourth embodiment, the same configurations of the projection system 100C as those of the first embodiment or the second embodiment are denoted with the same reference numerals, and therefore the description thereof will be omitted. In addition, the same operations of the projection system 100C as those of the first embodiment or second embodiment are described with the same step numbers and the like and the description thereof will be omitted.

As illustrated in FIG. 14, the projection system 100C includes the projection device 1A and display devices 6C and 6D. The projection device 1A and the display devices 6C and 6D are connected to the communication network 3. The projection device 1A and the display devices 6C and 6D are connected to each other through the communication network 3 so as to enable mutual data communication. The display device 6C corresponds to an example of the first display device, and the display device 6D corresponds to an example of the second display device.

The projection device 1A is installed at the use location S1. The display device 6C is installed at the use location S2, and the display device 6D is installed at a use location S4. The use locations S1, S2 and S4 are not limited, and may be separated from each other or adjacent to each other.

The configuration of the projection device 1A is as described in the second embodiment. The display devices 6C and 6D have the same configuration as that of the display device 6A described in the second embodiment. In the present embodiment, for the purpose of discrimination of the configurations, the display 61 provided in the display device 6C is referred to as first display 61C, and the display 61 provided in the display device 6D is referred to as second display 61D. Likewise, the touch sensor 62, the DP communication unit 63, and the DP control unit 70 provided in the display device 6C are referred to as first touch sensor 62C, first DP communication unit 63C, and first DP control unit 70C, respectively. In addition, the display 61, the touch sensor 62, the DP communication unit 63, and the DP control unit 70 provided in the display device 6D are referred to as second display 61D, second touch sensor 62D, second DP communication unit 63D, and second DP control unit 70D, respectively. These configurations are as described in the second embodiment. The first touch sensor 62C corresponds to an example of the first operation unit, and the second touch sensor 62D corresponds to an example of the second operation unit. In the following description and figures, the first display communication unit 63C and the second display communication unit 63D are referred to as the first DP communication unit 63C and the second DP communication unit 63D.

An operation of the projection system 100C is described below with reference to FIG. 16.

In FIG. 16, the PJ control unit 20 of the projection device 1A performs the processes of steps SA11, SA12, SA13, SA15, SA31, SA32 and SA33. The first DP control unit 70C of the display device 6C and the second DP control unit 70D of the display device 6D perform the processes of steps SB11, SB13, SB14, SB18 and SB21 to SA23. FIG. 16 illustrates an operation of the first DP control unit 70C and an operation of the second DP control unit 70D together. The operations of steps SA11, SA12, SA13 and SA15 and the operations of steps SB11, SB13, SB14, SB18 and SB21 to SA23 are the same as the operations described in the second embodiment, and therefore the description thereof will be omitted.

The projection device 1A generates a captured image by capturing the projection target OB at step SA11, and transmits the generated captured image to the display device 6C and the display device 6D at step SA12.

The display device 6C receives the captured image at step SB11, and displays the received captured image on the display 61 at step SB12. When the operation of the instructing member 65 is accepted at step SB13, the display device 6C generates the drawing image on the basis of the operation at step SB14.

At step SB21, the display device 6C displays the drawing image generated at step SB14 on the display 61. At step SB21, the display device 6C displays the drawing image in a superimposed manner on the captured image displayed on the display 61.

Further, at step SB22, the display device 6C transmits the drawing image generated at step SB14 to the projection device 1A, and proceeds to step SB18.

The display device 6D receives the captured image at step SB11, and displays the received captured image on the display 61 at step SB12. When the operation of the instructing member 65 is accepted at step SB13, the display device 6D generates the drawing image on the basis of the operation at step SB14.

At step SB21, the display device 6D displays the drawing image generated at step SB14 on the display 61. At step SB21, the display device 6D displays the drawing image in a superimposed manner on the captured image displayed on the display 61.

Further, at step SB22, the display device 6D transmits the drawing image generated at step SB14 to the projection device 1A, and proceeds to step SB18.

At step SA13, the projection device 1A receives the image from one or both of the display devices 6C and 6D. The projection device 1A proceeds to step SA31, and determines the display device 6 that is the transmission source of the received image. Specifically, the projection device 1A determines whether the transmission source of the image received at step SA13 is the display device 6C or the display device 6D.

At step SA32, the projection device 1A updates the image stored in the received image memory 27 on the basis of the determination result of at step SA31.

In the fourth embodiment, the projection device 1A stores the image corresponding to the display device 6C and the image corresponding to the display device 6D in the received image memory 27. The projection device 1A combines the image received from the display device 6C with the image corresponding to the display device 6C in the received image memory 27 and updates the image stored in the received image memory 27. In addition, the projection device 1A combines the image received from the display device 6D with the image corresponding to the display device 6D in the received image memory 27 and updates the image stored in the received image memory 27.

At step SA33, with the projection unit 10, the projection device 1A projects the image stored in the received image memory 27 after the update and proceeds to step SA15.

The projection device 1A projects, onto the projection target OB, a composite image of the image received from the display device 6C and the image received from the display device 6D, for example.

FIG. 17 illustrates the operation states ST1 and ST2 of the projection system 100C. The projection target OB of the projection device 1A is composed of the plane OB1 and the object OB2 is placed at it as in the second embodiment.

In the state ST1, the projection device 1A generates a captured image by capturing the plane OB1 and the object OB2, and transmits a captured image P31 to the display devices 6C and 6D. The captured image P31 includes the object image OP11, which is a captured image of the object OB2. The display device 6C receives the captured image P31 and displays the captured image P31 on the first display 61C. The display device 6D receives the captured image P31 and displays the captured image P31 on the second display 61D.

The state ST2 is a state where an operation is performed with the instructing member 65 at the display devices 6C and 6D. The display device 60 draws the drawing image DP31 on the basis of the operation of the instructing member 65. The display device 6C displays the drawing image DP31 on the first display 61C and transmits a transmission image P32 including the drawing image DP31 to the projection device 1A. The display device 6D draws the drawing image DP32 on the basis of the operation of the instructing member 65. The display device 6D displays the drawing image DP32 on the second display 61D and transmits a transmission image P33 including the drawing image DP32 to the projection device 1A. The drawing image DP31 and the drawing image DP32 are examples of "first DP drawing image" and "second DP drawing image" respectively.

The projection device 1A receives the transmission images P32 and P33. The projection device 1A updates the image corresponding to the display device 6C in the received image memory 27 on the basis of the transmission image P32. More specifically, the image already stored in association with the display device 6C in the received image memory 27 is combined with the transmission image P32 and updated. In addition, the projection device 1A updates the image corresponding to the display device 6D in the received image memory 27 on the basis of the transmission image P33. More specifically, the image already stored in association with the display device 6D in the received image memory 27 is updated to the composite image of the stored image and the transmission image P33.

The projection system 100C of the fourth embodiment is a system including the projection device 1A, the display device 6C and the display device 6D. The display device 6C includes the first DP communication unit 63C, the first display 61C and the first touch sensor 62C. The display device 6C displays, on the first display 610, the captured image received by the first DP communication unit 63C from the projection device 1A, generates the drawing image on the basis of the drawing operation accepted by the first touch sensor 62C while the captured image is being displayed first DP, and transmits the generated first DP drawing image to the projection device 1A with the first DP communication unit 63C. The display device 6D includes the second DP communication unit 63D, the second display 61D and the second touch sensor 62D. The display device 6D displays, on the second display 61D, the captured image received by the second DP communication unit 63D from the projection device 1A, generates the second DP drawing image on the basis of the drawing operation accepted by the second touch sensor 62D while the captured image is being displayed, and transmits the generated second DP drawing image to the projection device 1A with the second DP communication unit 63D. The projection device 1A includes the PJ communication unit 42, the projection unit 10 and the image-capturing unit 15. With the PJ communication unit 42, the projection device 1A communicates with the display device 6C and the display device 6D, projects the first DP drawing image received from the display device 6C and the second DP drawing image received from the display device 6D with the projection unit 10, and transmits, to the display device 6C and the display device 6D, the captured image obtained with the image-capturing unit 15 by capturing a range including the projection target on which the first DP drawing image and the second DP drawing image are projected.

In the control method for the projection system 100C including the projection device 1A, the display device 6C and the display device 6D, the display device 6C displays, on the first display 61C, the captured image received by the first DP communication unit 63C from the projection device 1A, generates the first DP drawing image on the basis of the drawing operation accepted by the first touch sensor 62C while the captured image is being displayed, and transmits the generated first DP drawing image to the projection device 1A with the first DP communication unit 63C. The display device 6D displays, on the second display 61D, the captured image received by the second DP communication unit 63D from the projection device 1A, generates the second DP drawing image on the basis of the drawing operation accepted by the second touch sensor 62D while the captured image is being displayed, and transmits the generated second DP drawing image to the projection device 1A with the second DP communication unit 63D. With the PJ communication unit 42, the projection device 1A communicates with the display device 6C and the display device 6D, projects the first DP drawing image received from the display device 6C and the second DP drawing image received from the display device 6D with the projection unit 10, and transmits, to the display device 6C and the display device 6D, the captured image obtained with the image-capturing unit 15 by capturing a range including the projection target on which the first DP drawing image and the second DP drawing image are projected.

With the projection system 100C of the fourth embodiment, the state of the projection target OB of the projection device 1A can be displayed with the display devices 6C and 6D. In addition, the image drawn on the basis of the operation of the display device 6C and the image drawn on the basis of the operation of the display device 6D can be projected with the projection device 1A. In this manner, the state of the projection target OB and the details of drawing operation can be shared between the user using the projection device 1A and the user using the display device 6C, and the user using the projection device 1A and the user using the display device 6D.

The projection device 1A includes the received image memory 27 that stores the image received by the PJ communication unit 42. The projection device 1A stores, in the received image memory 27, the drawing image DP31 received from the display device 6C and the drawing image DP32 received from the display device 6D. Each time the drawing image DP31 or second the drawing image DP32 is received, the projection device 1A updates the image stored in the received image memory 27, and projects the image updated in the received image memory 27 with the projection unit 10. In this manner, the projection device 1A can store, in the received image memory 27, a plurality of drawing images generated at different timings by the display device 6C. The same applies to the display device 6D. In this manner, the projection device 1A can project a plurality of drawing images generated at different timings at the display device 6C and the display device 6D. Thus, reduction of the display quality due to overlap of the drawing image and the captured image corresponding to the drawing image can be prevented, and the drawing image drawn through operations of multiple times can be shared between the projection device 1A and the display devices 6C and 6D.

5. Other Embodiments

The above-described embodiments are favorable embodiments of the present disclosure. However, this is not limitative, and various variations may be implemented within the scope that does not depart from the gist of the disclosure.

The configurations illustrated in FIGS. 3 and 4 are examples, and the configurations of the projection unit 10 and the image-capturing unit 15 provided in the projection device 1 may be changed as desired. For example, the image-capturing unit 15 may be configured as a member separated from the projection device 1. The same applies to projection devices 1A, 1B and 10.

The configurations of the projection devices 1, 1A, 1B and 10 and display devices 6, 6A, 6B, 6C and 6D illustrated in FIGS. 2, 7, 11 and 15 are functional configurations, and their specific mounting forms are not limited. Specifically, it is not necessary to mount hardware corresponding to respective functional parts, and it is possible to adopt a configuration in which the functions of a plurality of functional parts are implemented when a single processor performs a program. In addition, in the above-mentioned embodiment and modifications, a part of the function implemented by software may be implemented by hardware, and a part of the function implemented by hardware may be implemented by software.

In addition, the unit of the processing of the sequence diagram illustrated in FIGS. 5, 8, 12, and 16 is divided in accordance with the content of the main processing for the purpose of easy understanding of the operation of each device of the projection systems 100, 100A, 100B and 100C, and the present disclosure is not limited to the names and the divisions of the units of processing. In accordance with the content of the processing, the process implemented by each device may be further divided into more units of processing, and may be divided such that one unit of processing further includes more processes.

The control program 26 may be recorded in a recording medium recorded such that it is readable by the projection devices 1, 1A, 1B and 10, for example. As the recording medium, magnetic and optical recording media or semiconductor memory devices may be used. Specifics examples include portable or fixed recording media such as flexible disk and optical disk-type storage media, magneto-optical disk recording media, and semiconductor storage devices. In addition, it is possible to adopt a configuration in which these programs are stored in a server device and the like, and the programs are downloaded from the server device as necessary. The same applies to the control program 76.

What is claimed is:

1. A projection system comprising
a projection device including:
    a projector communication device,
    a light projection device configured to project an image onto a projection target,
    an image sensor configured to capture a range including the projection target, and
    a projector processor configured to project, using the light projection device, an image received by the projector communication device, and transmit, using the projector communication device, a captured image generated by the image sensor; and
a display device including:
    a display communication device configured to communicate with the projection device,
    a display configured to display an image,
    an operation device configured to accept a drawing operation, and
    a display processor configured to display, on the display, the captured image received by the display communication device, generate a drawing image based on the drawing operation performed on the captured image and accepted by the operation device while the captured image is being displayed, display a composite image generated by superimposing the drawing image and the captured image, and transmit, using the display communication device, the generated drawing image.

2. The projection system according to claim 1, wherein the display device includes a drawing image memory configured to store the drawing image, and
the display device is configured to, based on the drawing operation accepted by the operation device, update the drawing image stored in the drawing image memory, and transmit the updated drawing image to the projection device.

3. The projection system according to claim 1, wherein the projection device includes a received image memory configured to store the image received by the projector communication device, and
the projection device is configured to
update an image stored in the received image memory based on the image received by the projector communication device, and
project the image updated in the received image memory, using the light projection device.

4. A projection system comprising
a first projection device including:
    a first light projection device,
    a first image sensor,
    a first projector communication device, and
    a first projector processor configured to project, using the first light projection device, an image received by the first projector communication device, generate a first captured image by capturing, using the first image sensor, a range including a projection target of the first light projection device, and transmit the first captured image using the first projector communication device;
a second projection device including:
    a second light projection device,
    a second image sensor,
    a second projector communication device, and
    a second projector processor configured to project, by the second light projection device, an image received by the second projector communication device, generate a second captured image by capturing, using the second image sensor, a range including a projection target of the second light projection device, and transmit the second captured image using the second projector communication device; and
a display device including:
    a display,
    an operation device,
    a display communication device, and
    a display processor configured to:
        communicate with the first projection device and the second projection device using the display communication device;

display, in a first region of the display, the first captured image received from the first projection device, generate a first region drawing image based on a drawing operation corresponding to the first region accepted by the operation device, transmit the first region drawing image to the first projection device; and display, in a second region of the display, the second captured image received from the second projection device, generate a second region drawing image based on a drawing operation corresponding to the second region accepted by the operation device, and transmit the second region drawing image to the second projection device.

5. The projection system according to claim 4, wherein the display device includes a first drawing image memory configured to store the first region drawing image, and a second drawing image memory configured to store the second region drawing image, the display device is configured to, based on a drawing operation corresponding to the first region, update the first region drawing image stored in the first drawing image memory, and transmit the updated first region drawing image to the first projection device, and the display device is configured to, based on a drawing operation corresponding to the second region, update the second region drawing image stored in the second drawing image memory, and transmit the updated second region drawing image to the second projection device.

6. A projection system comprising
a projection device including:
  a projector communication device,
  a light projection device,
  an image sensor, and
  a projector processor;
a first display device including:
  a first display communication device,
  a first display,
  a first operation device, and
  a first display processor configured to display, on the first display, a captured image received by the first display communication device from the projection device, generate a first display drawing image based on a drawing operation accepted by the first operation device while the captured image is being displayed, and transmit, using the first display communication device, the generated first display drawing image to the projection device;
a second display device including:
  a second display communication device,
  a second display,
  a second operation device, and
  a second display processor configured to display, on the second display, a captured image received by the second display communication device from the projection device, generate a second display drawing image based on a drawing operation accepted by the second operation device while the captured image is being displayed, and transmit, using the second display communication device, the generated second display drawing image to the projection device, wherein the projector processor is configured to communicate with the first display device and the second display device, using the projector communication device, project, using the light projection device, the first display drawing image received from the first display device and the second display drawing image received from the second display device, and transmit, to the first display device and the second display device, a captured image obtained by capturing, using the image sensor, a range including a projection target on which the first display drawing image and the second display drawing image are projected.

7. The projection system according to claim 6, wherein the projection device includes a received image memory configured to store an image received by the projector communication device, the projection device is configured to store, in the received image memory, the first display drawing image received from the first display device and the second display drawing image received from the second display device, update an image stored in the received image memory every time the first display drawing image or the second display drawing image is received, and project, by the light projection device, the image updated in the received image memory.

* * * * *